US012368271B2

(12) United States Patent
Lin et al.

(10) Patent No.: US 12,368,271 B2
(45) Date of Patent: Jul. 22, 2025

(54) CONNECTOR

(71) Applicant: Delta Electronics, Inc., Taoyuan (TW)

(72) Inventors: Cheng-Yi Lin, Taoyuan (TW); Ting-Yun Lu, Taoyuan (TW); Yi-Chih Hsu, Taoyuan (TW); Sheng-Yu Wen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 386 days.

(21) Appl. No.: 18/113,557

(22) Filed: Feb. 23, 2023

(65) Prior Publication Data

US 2024/0006829 A1 Jan. 4, 2024

(30) Foreign Application Priority Data

Jun. 30, 2022 (CN) ......................... 202221689392.3

(51) Int. Cl.
*H01R 24/60* (2011.01)
*H01R 13/627* (2006.01)

(52) U.S. Cl.
CPC ......... *H01R 24/60* (2013.01); *H01R 13/6273* (2013.01)

(58) Field of Classification Search
None
See application file for complete search history.

(56) References Cited

U.S. PATENT DOCUMENTS 6,916,188 B2 7/2005 Lang et al.
7,204,718 B2 4/2007 Lai
7,611,386 B1 11/2009 Zhang et al.
8,043,123 B2 10/2011 Hsieh
8,715,010 B2 5/2014 Wang et al.
8,961,242 B2 2/2015 Kim et al.
9,478,917 B2 10/2016 Strobl et al.
2002/0106926 A1 8/2002 Lindberg et al.
2012/0052736 A1* 3/2012 Fukushi ................. H01R 4/484 439/626

(Continued)

FOREIGN PATENT DOCUMENTS

CN 102075090 B 3/2014
CN 106159582 A 11/2016

(Continued)

*Primary Examiner* — Oscar C Jimenez
(74) *Attorney, Agent, or Firm* — KIRTON McCONKIE; Evan R. Witt

(57) ABSTRACT

A connector is disclosed and includes a main body, a sleeving component, a conductive terminal and a signal terminal. The main body has an opening end and a sleeved end opposite to each other. An electronic device end is matched with the connector through the opening end. The sleeving component is slidably disposed on the sleeved end, and includes a conductive contact portion and a signal contact portion arranged in parallel. The conductive terminal is fixed to the main body for connecting with the conductive contact portion. The signal terminal is fixed to the main body for connecting with the signal contact portion. When the connector is detached from the electronic device end, the sleeving component is displaced relative to the main body, the signal contact portion is separated from the signal terminal, and the conductive terminal end and the conductive contact portion are maintained in an electrical connection.

20 Claims, 22 Drawing Sheets

(56) References Cited

U.S. PATENT DOCUMENTS

| | | | | |
|---|---|---|---|---|
| 2014/0051274 | A1 | 2/2014 | Yu et al. | |
| 2015/0333432 | A1* | 11/2015 | Wu | H01R 13/502 439/39 |
| 2016/0141817 | A1* | 5/2016 | Wu | H01R 24/60 439/676 |
| 2017/0194755 | A1 | 7/2017 | Cheng et al. | |
| 2017/0222371 | A1 | 8/2017 | Zhang | |
| 2017/0271822 | A1 | 9/2017 | Zhang | |

FOREIGN PATENT DOCUMENTS

| | | | |
|---|---|---|---|
| CN | 104752898 | B | 10/2017 |
| CN | 109546427 | B | 3/2020 |
| CN | 109565128 | B | 1/2021 |
| IN | 104752903 | B | 1/2018 |
| TW | 201537835 | A | 10/2015 |
| TW | 201537845 | A | 10/2015 |
| TW | M512233 | U | 11/2015 |
| TW | I607609 | B | 12/2017 |

* cited by examiner

CONNECTOR

CROSS-REFERENCE TO RELATED APPLICATION

This application claims priority to China Patent Application No. 202221689392.3, filed on Jun. 30, 2022. The entire contents of the above-mentioned patent application are incorporated herein by reference for all purposes.

FIELD OF THE INVENTION

The present disclosure relates to a connector, and more particularly to a high-power and anti-arcing connector for avoiding carbon deposition generated due to the electric arc.

BACKGROUND OF THE INVENTION

Regarding the USB power supply, a USB connector is used to transmit the power form a source to a sink. In the past, several different connector interfaces are used in the various mobile devices, such as laptops and mobile phones, and it results in the incompatibility of various connectors on the market. It further causes other problems such as the application limitation and the resource waste. Therefore, the Type-C connector and the USB PD (Power Delivery) protocol are utilized for the PD power supply of various mobile devices in the current market, and the data transmission, the power supply and power reception, and the video signal communication between the mobile devices and the peripheral storage devices are accomplished through one Type-C connector.

Due to the convenience of use, the Type-C connector is widely used in the high-power power transmission and the quick-charging applications. The power delivery is completed by the user's plugging and unplugging action. However, in the context of the high-power power transmission and the quick-charging applications, the power is transmitted directly and instantaneously from the source to the sink at a large flow. If any user unplugs the connector connected between the source and the sink inappropriately, carbon deposition is easily generated at the conductive terminals due to the electric arc, and the temperature may rise too high. That is, carbon deposition may cause higher contact resistance and temperature raised due to the heat generated which could lead to the safety concern, and even an instant arcing. As accumulated over time, the service life of the connector is degraded, and the safety problems in use are caused.

Therefore, there is a need of providing a connector for decreasing the voltage in advance before the removal of the connector from the electronic device end is completed, so as to avoid the occurrence of the electric arc during hot swapping, avoid the formation of the carbon deposition due to the electric arc, prolong the service life of the connector, and obviate the drawbacks encountered by the prior arts.

SUMMARY OF THE INVENTION

An object of the present disclosure is to provide a connector for connecting with an electronic device end. A main body and a sleeving component of the connector are designed in a slidable type, and the disconnection of the signal terminal is controlled by the pulling action of the connector being pulled away from the electronic device end. When the connector is pulled and separated from the electronic device end, the signal contact portion disposed on the sleeving component is separated from the signal terminal disposed on the main body firstly, and the conductive contact portion disposed on the sleeving component and the conductive terminal disposed on the main body end are maintained in an electrical connection. At this time, the power supply system connected to the connector controls the output voltage to be decrease or stops the output voltage in advance. Thereafter, when the connector is separated from the electronic device end completely, the potential difference between the conductive terminal and the conductive contact pin of the electronic device end is less than a certain degree. It has advantages of avoiding the occurrence of the electric arc during hot swapping, avoiding the formation of the carbon deposition due to the electric arc, so as to prolong the service life of the connector and solve the safety problems in use.

Another object of the present disclosure is to provide a connector for connecting with an electronic device end. With the main body and the sleeving component designed in a slidable type, when the connector is pulled and disconnected from the electronic device end through the sleeving component thereof, the sleeving component is forced to slide relative to the main body firstly. At this time, the main body is not slid relative to the electronic device end, and the conductive contact portion disposed on the sleeving component and the conductive terminal disposed on the main body are maintained in the electrical connection. However, the signal contact portion disposed on the sleeving component and the signal terminal disposed on the main body are separated due to the relative sliding distance between the sleeving component and the main body, so as to form a spaced distance. Under these conditions, a controller of a power supply system connected to the connector is allowed to determine that the connector is in the unplugging operation according to the disconnection state between the signal contact portion and the signal terminal. Moreover, at the same time, a switch element or a power-off unit is controlled to step down the output voltage or stop the output voltage, so that the output voltage is discharged through a discharge path. Thereafter, when the main body of the connecter is separated from the electronic device end completely, the output voltage between the electronic device end and the connector has been stepped down from a high level to a low level, or the output voltage is stopped. With the output voltage at the low level or stopped, the conductive terminal and the conductive contact pin of the electronic device end are disconnected, and it is not easy to cause the electric arc. At the same time, it also avoids the formation of the carbon deposition due to the electric arc, so as to prolong the service life of the connector and solve the safety problems in use. On the other hand, when the connector is connected to the electronic device end, the main body and the sleeving component slide relatively to a connection position, and the signal contact portion disposed on the sleeving component is maintained at the connection position with the signal terminal disposed on the main body through the engagement force provided by the first engaging element and a second engaging element. The first engaging element and the second engaging element are, for example, a hook and a slot disposed on the signal connection end and the signal contact portion, or a convex portion and a concave portion disposed on the main body and the sleeving component. The engagement force provided by the first engaging element and the second engaging element facilitates the signal contact portion disposed on the sleeving component and the signal terminal disposed on the main body to maintain the electrical connection stably. In order to increase the smoothness of the sliding of the sleeving component relative to the main body, an elastic element is further arranged between the sleeving component and the main body to provide an elastic restoring force, which is smaller than the aforementioned engagement force. In that, after the connector is detached from the electronic device end, the sleeving component is pushed away from the main body, and the signal contact portion disposed on the sleeving component and the signal terminal disposed on the main body are maintained in a normal separation state.

In accordance with an aspect of the present disclosure, a connector is provided for matching and connecting with an electronic device end. The electronic device end includes a main body, a sleeving component, a conductive terminal and a signal terminal. The main body includes an opening end and a sleeved end. The opening end and the sleeved end are opposite to each other, and the electronic device end is matched and connected with the connecter through the opening end. The sleeving component is slidably connected to the main body, and includes an accommodation space, a conductive contact portion and a signal contact portion. The conductive contact portion and the signal contact portion are accommodated in the accommodation space. The conductive contact portion and the signal contact portion are arranged in parallel along a first direction, respectively. The conductive terminal is fixed to the main body along the first direction and includes a conductive connection end extended to the accommodation space through the sleeved end and connected to the conductive contact portion in an electrical connection. The signal terminal is fixed to the main body along the first direction and includes a signal connection end extended to the accommodation space through the sleeved end and detachably connected to the signal contact portion. When the connector is detached and separated from the electronic device end, the sleeving component is displaced relative to the main body along the first direction, the signal contact portion is driven to separate from the signal connection end, and the conductive connection end and the conductive contact portion are maintained in the electrical connection.

In an embodiment, when the connector is matched with the electronic device end, the electronic device end is connected to the main body, the conductive terminal and the signal terminal are interfered with the electronic device end, and the sleeving component is displaced relative to the main body along a direction opposite to the first direction, so that the signal contact portion is driven to move toward the signal connection end, and the signal connection end is engaged with the signal contact portion to form an electrical connection.

In an embodiment, the connector further includes a first engaging element and a second engaging element spatially corresponding to each other, wherein the first engaging element is disposed adjacent to the sleeved end, and the second engaging element is disposed in the accommodation space, wherein when the connector and the electronic device end are connected with each other, the first engaging element and the second engaging element are engaged with each other to form an engagement force, so as to maintain the electrical connection between signal connection end and the signal contact portion.

In an embodiment, the first engaging element is disposed on the signal connection end, and the second engaging element is disposed on the signal contact portion.

In an embodiment, one of the first engaging element and the second engaging element is a hook, and another one of the first engaging element and the second engaging element is a slot matched with the hook.

In an embodiment, the first engaging element is disposed on a peripheral wall of the sleeved end, and the second engaging element is disposed on an inner wall of the sleeving component.

In an embodiment, one of the first engaging element and the second engaging element is a convex portion, and another one of the first engaging element and the second engaging element is a concave portion matched with the convex portion.

In an embodiment, when the connector and the electronic device end are connected with each other, a clamping force is formed between the connector and the electronic device end, wherein the engagement force is smaller than the clamping force.

In an embodiment, the conductive terminal includes a conductive elastic-clamping arm, the signal terminal includes a signal elastic-clamping arm, and the electronic device end includes a tongue, wherein when a pull-out force acts on the sleeving component along the first direction, the sleeving component is slid relative to the main body along the first direction, the conductive connection end are the conductive contact portion are maintained in the electrical connection, and then the signal contact portion is separated from the signal connection end, so that the conductive elastic-clamping arm and the signal elastic-clamping arm are separated from the tongue, wherein the pull-out force is greater than the clamping force.

In an embodiment, the connector further includes an elastic element arranged between the main body and the sleeving component, so as to provide an elastic restoring force, wherein when the connector is detached and separated from the electronic device end, the sleeving component is pushed and separated away from the main body, wherein the elastic restoring force is less than the engagement force.

In an embodiment, when the connector is connected with the electronic device end, an interference length formed between the conductive connection end and the conductive contact portion is greater than an interference length formed between the signal connection end and the signal contact portion.

In an embodiment, when the connector is detached and separated from the electronic device end, the sleeving component is displaced relative to the main body along the first direction at a sliding distance, and a spaced distance is formed between the signal contact portion and the signal connection end, wherein the sliding distance is greater than the spaced distance.

In an embodiment, a length of the conductive connection end and a length of the signal connection end are equal to each other, a length of the conductive contact portion is greater than a length of the signal contact portion, and the difference of the lengths of the conductive contact portion and the signal contact portion is greater than the spaced distance.

In an embodiment, a length of the conductive contact portion and a length of the signal contact portion are equal to each other, a length of the conductive connection end is greater than a length of the signal connection end, and the difference of the lengths of the conductive connection end and the signal connection end is greater than the spaced distance.

In an embodiment, the connector is further connected to a power supply system, wherein the power supply system includes a controller configured to control an output voltage transmitted through the conductive contact portion and the conductive terminal, wherein when the signal contact portion is separated from the signal terminal, and the conductive contact portion and the conductive terminal are maintained in the electrical connection, the controller steps down the output voltage or stops the output voltage.

In an embodiment, the power supply system further includes a power-off unit electrically connected to the controller, wherein when the signal contact portion is separated from the signal terminal, and the conductive contact portion and the conductive terminal are maintained in the electrical connection, the controller steps down the output voltage or stops the output voltage through the power-off unit.

In an embodiment, the power supply system further includes a switch element electrically connected to the controller, wherein when the signal contact portion is separated from the signal terminal, and the conductive contact portion and the conductive terminal are maintained in the electrical connection, the controller steps down the output voltage or stops the output voltage through the switch element.

In an embodiment, the connector is a USB Type-C connector.

In accordance with another aspect of the present disclosure, a USB connector is provided. The USB connector includes a main body, a sleeving component, a conductive terminal and a signal terminal. The main body includes an opening end and a sleeved end, wherein the opening end and the sleeved end are opposite to each other. The sleeving component is slidably connected to the main body, and includes an accommodation space, a conductive contact portion and a signal contact portion, wherein the conductive contact portion and the signal contact portion are accommodated in the accommodation space and arranged along a first direction. The conductive terminal is fixed to the main body along the first direction and includes a conductive connection end extended to the accommodation space through the sleeved end and detachably connected to the conductive contact portion. The signal terminal is fixed to the main body along the first direction and includes a signal connection end extended to the accommodation space through the sleeved end and detachably connected to the signal contact portion, wherein when the sleeving component is displaced relative to the main body along the first direction so as to separate the signal contact portion from the signal connection end, the conductive connection end and the conductive contact portion are maintained to connect with each other.

In an embodiment, the USB connector further includes an elastic element arranged between the main body and the sleeving component, so as to assist the signal contact portion in separating away from the signal connection end along the first direction.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1A:
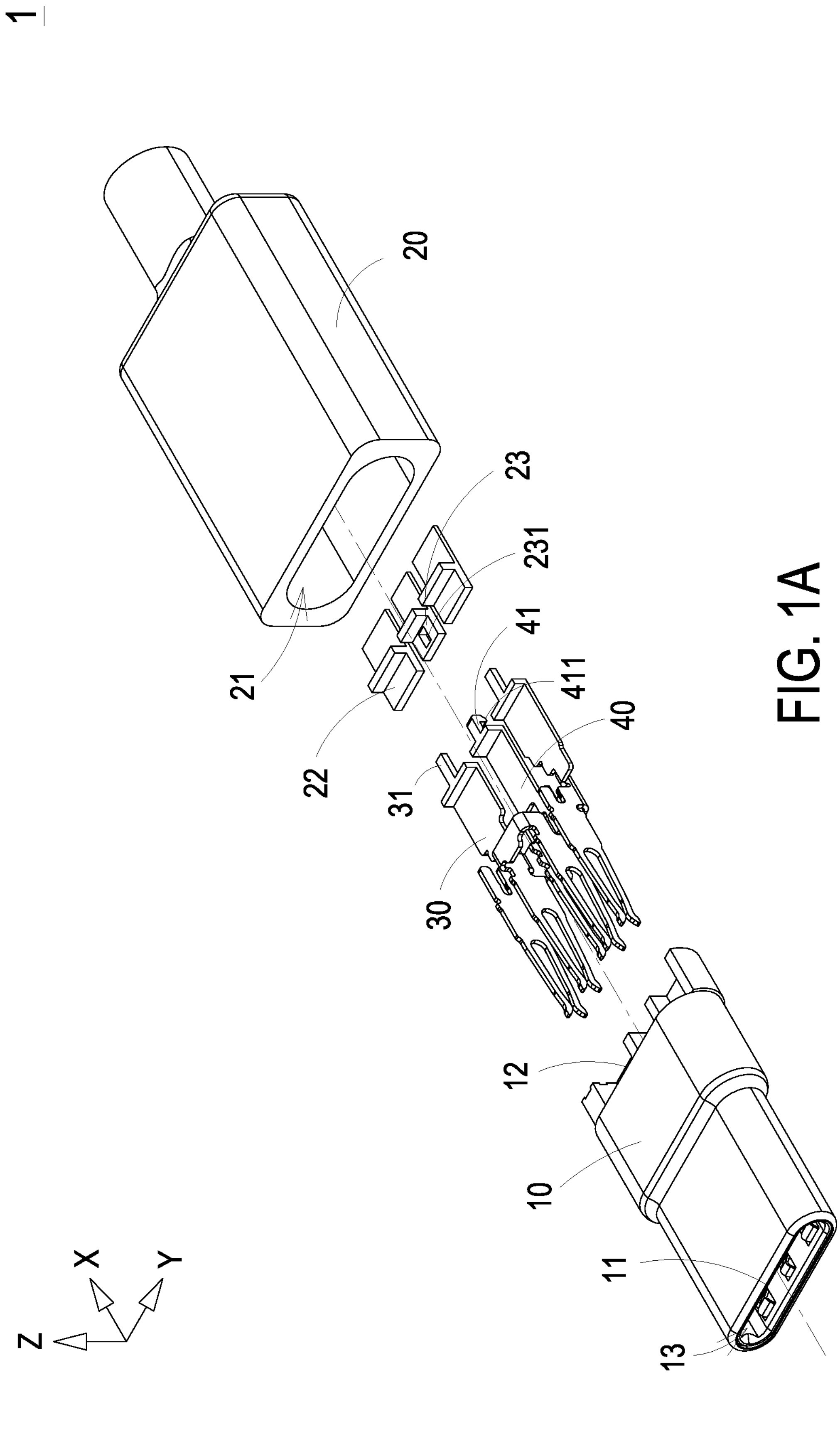
FIG. 1A is an exploded view illustrating a connector according to a first embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "inwardly," "outwardly," "upper," "lower" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments.

Figure 1B:
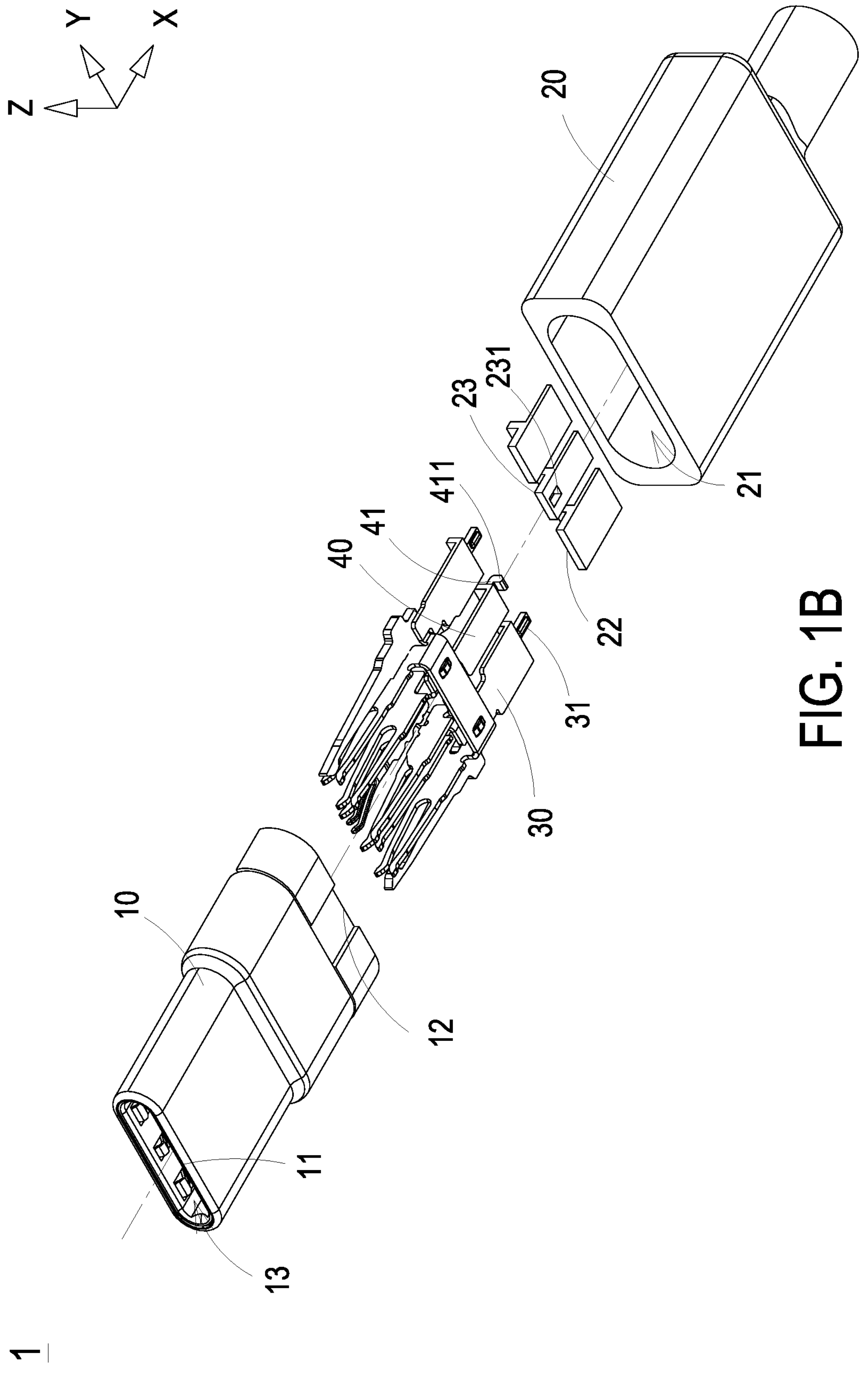
FIG. 1B is an exploded view illustrating the connector according to the first embodiment of the present disclosure and taken from another perspective.
Figure 2A:
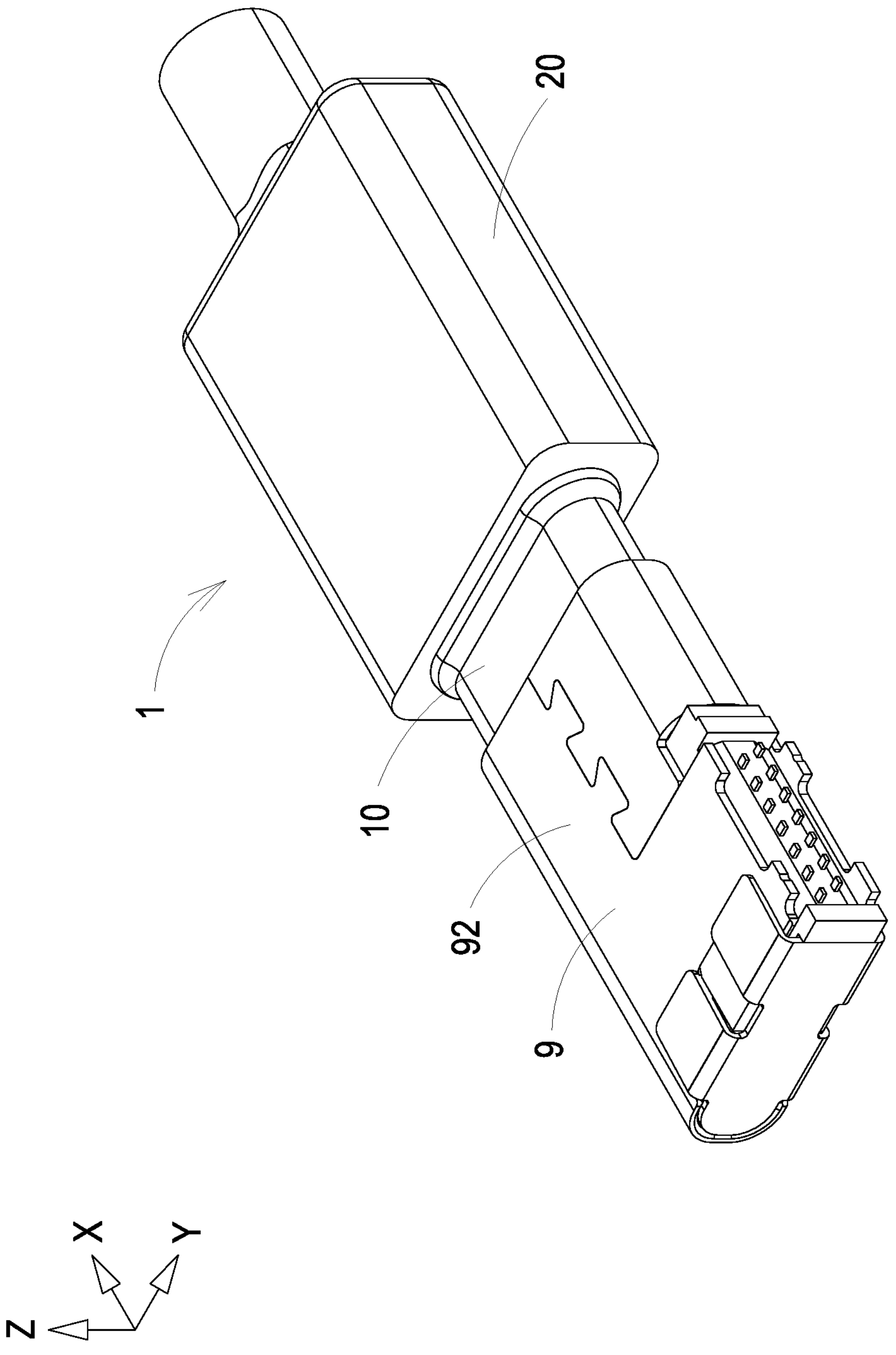
FIGS. 2A to 2C are schematic diagrams showing the actions of detaching the connector and the electronic device end from a connected state to a separated state according to the first embodiment of the present disclosure.
Figure 2B:
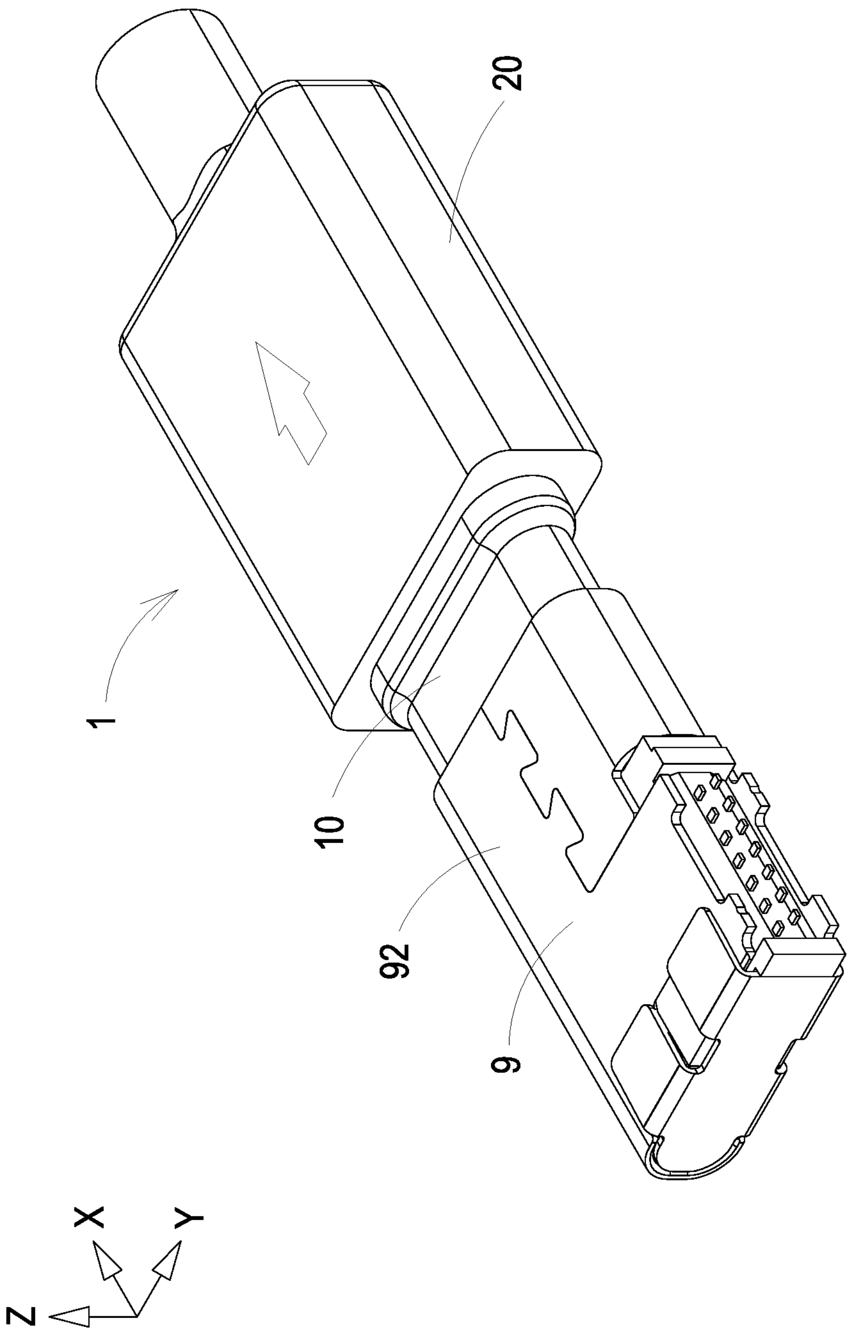
Figure 2C:
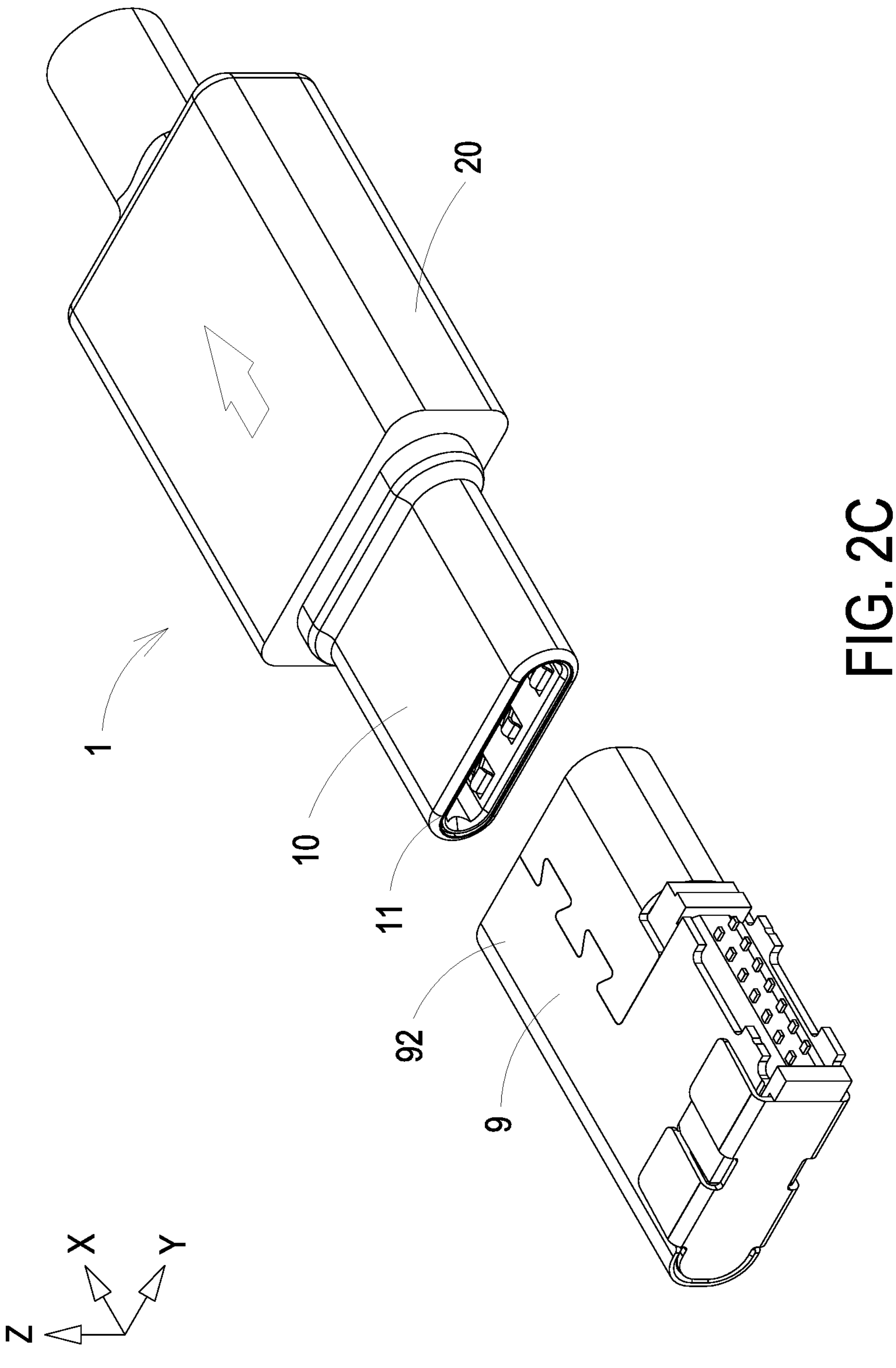
Figure 3:
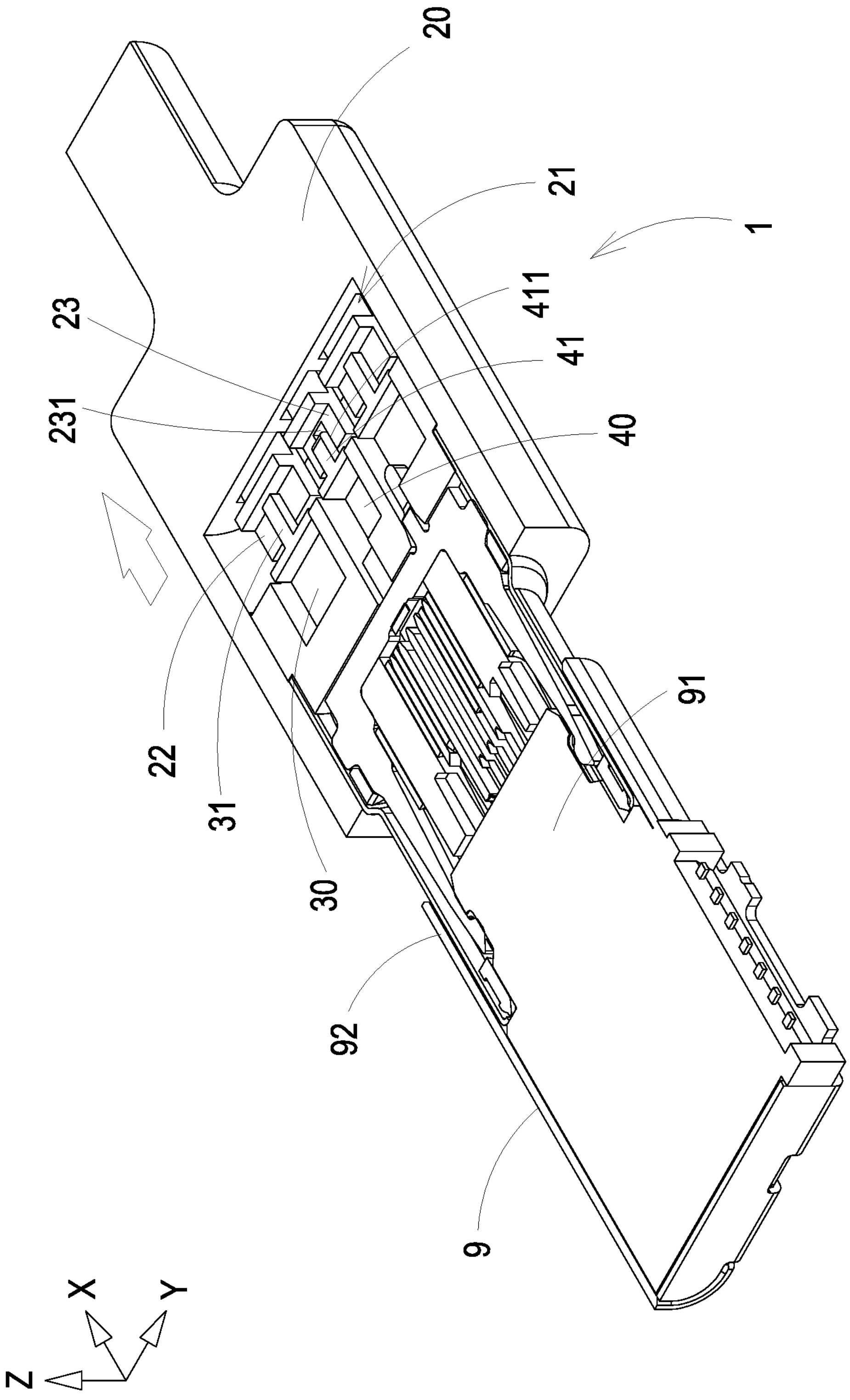
FIG. 3 is a cross-section structural view illustrating the sleeving component not slid relative to the main body when the connector is detached from the electronic device end according to the first embodiment of the present disclosure.
Figure 4:
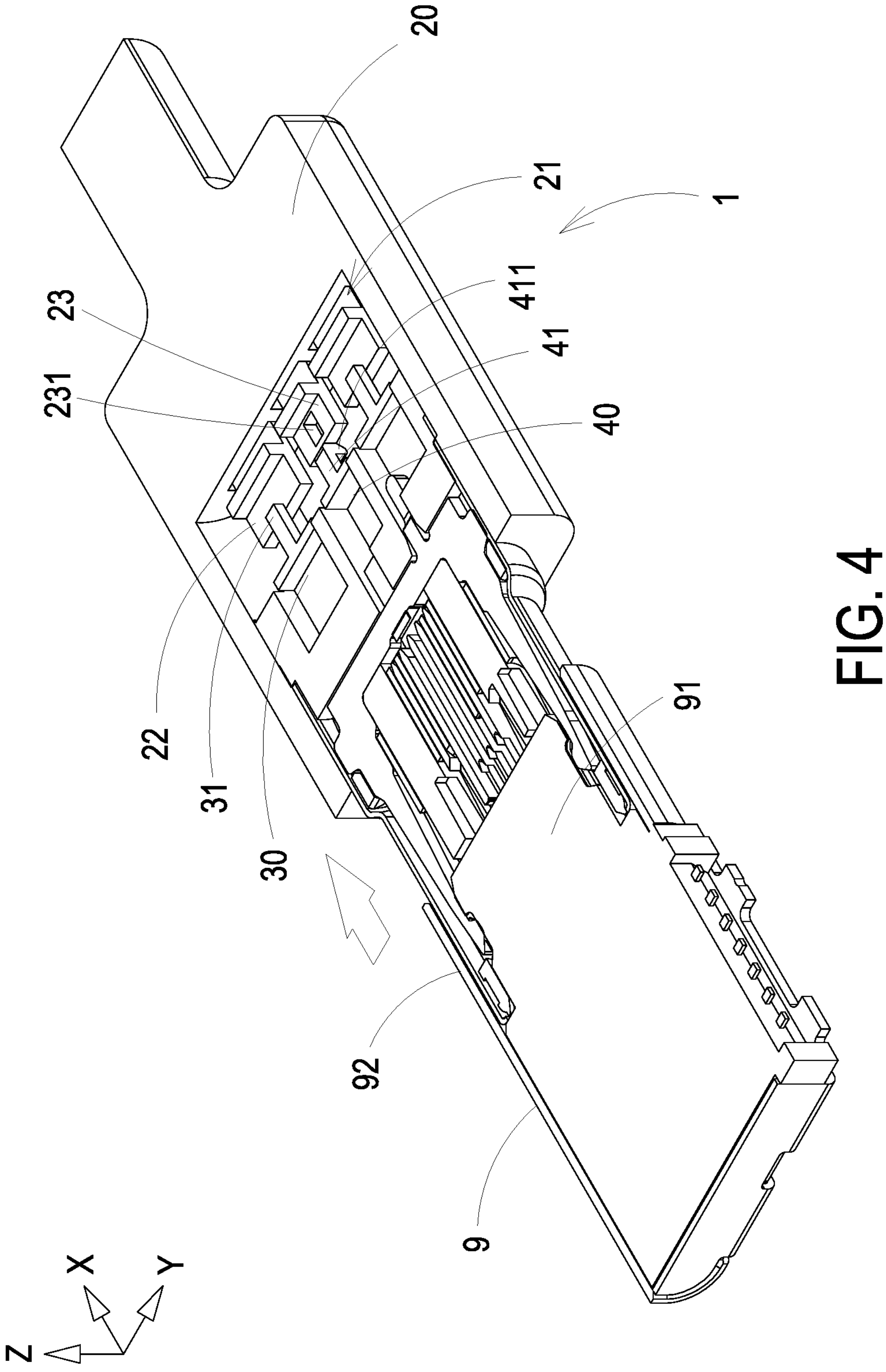
FIG. 4 is a cross-section structural view illustrating the sleeving component slide relative to the main body when the connector is detached from the electronic device end according to the first embodiment of the present disclosure.
Figure 5:
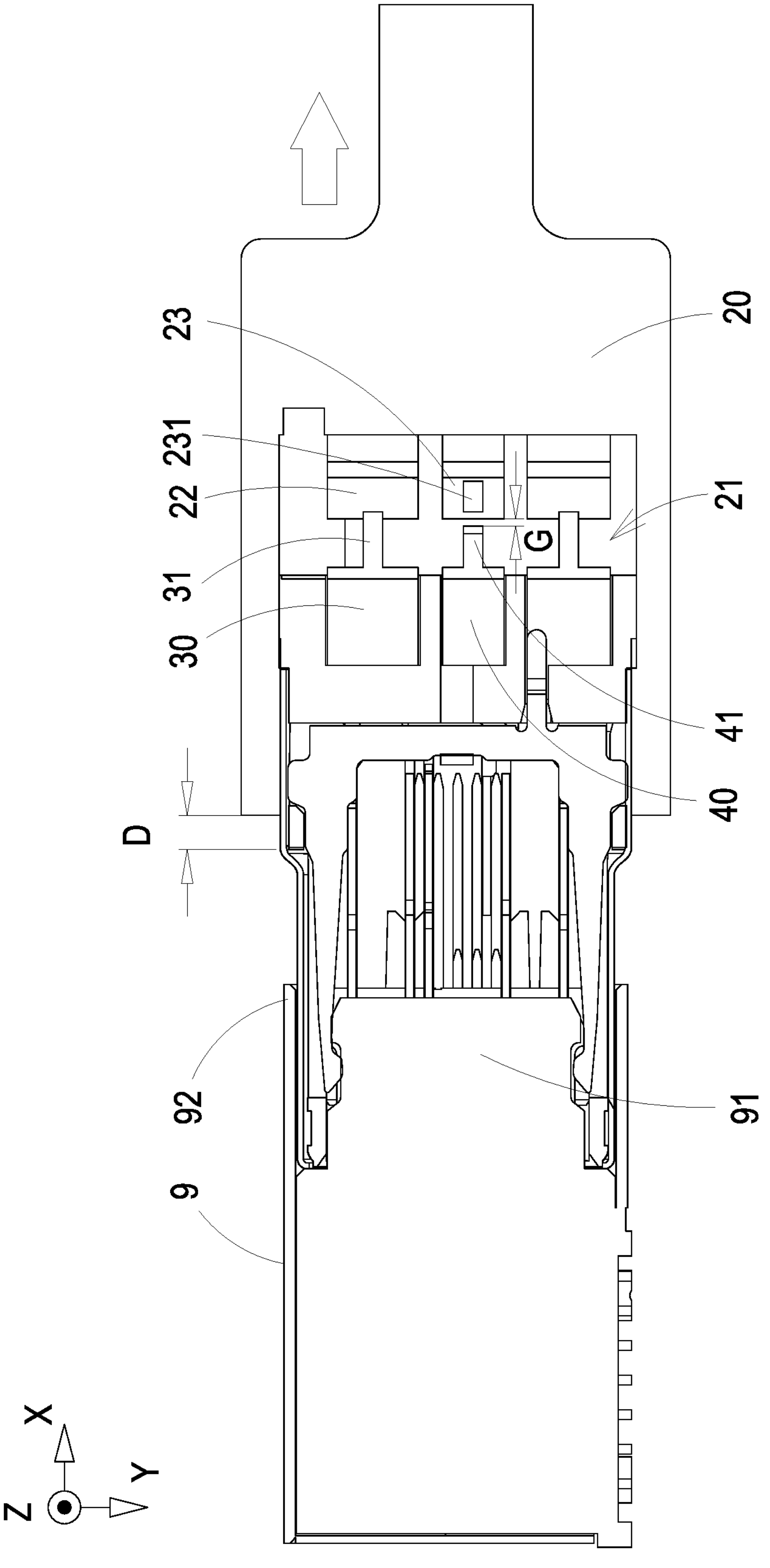
FIG. 5 is a top view of FIG. 4.

FIGS. 1A and 1B are exploded views illustrating a connector according to a first embodiment of the present disclosure. FIGS. 2A to 2C are schematic diagrams showing the actions of detaching the connector and the electronic device end from a connected state to a separated state according to the first embodiment of the present disclosure. FIG. 3 is a cross-section structural view illustrating the sleeving component not slid relative to the main body when the connector is detached from the electronic device end according to the first embodiment of the present disclosure. FIG. 4 is a cross-section structural view illustrating the sleeving component slide relative to the main body when the connector is detached from the electronic device end according to the first embodiment of the present disclosure. FIG. 5 is a top view of FIG. 4. In the embodiment, the connector 1 is for example but not limited to a USB Type-C connector. Preferably but not exclusively, the connector 1 is used for matching and connecting with an electronic device, for example but not limited to computer, cellphone, power bank, having a USB Type-C interface along a first direction. The connector 1 can communicate with the electronic device in accordance with communication protocols, for example but not limited to PD (power delivery). The first direction is for example but not limited to the X axial direction. Preferably but not exclusively, when the connector 1 and the electronic device end 9 are matched with each other, the electronic device end 9 is moved toward the connector 1 in the first direction (i.e., the X axial direction), or the connector 1 is moved toward the electronic device end 9 in an opposite direction (i.e., the reverse X axial direction) of the first direction. In addition, when the connector 1 and the electronic device end 9 are detached and separated from each other, the connector 1 is moved and separated away from the electronic device end 9 in the first direction (i.e., the X axial direction), or the electronic device end 9 is moved and separated away from the connector 1 in the opposite direction (i.e., the reverse X axial direction) of the first direction. It is explained here firstly. The present disclosure is not limited thereto. In the embodiment, the electronic device end 9 includes a tongue 91 and a sleeve 92, and the sleeve 92 surrounds the periphery of tongue 91. In the embodiment, the connector 1 includes a main body 10, a sleeving component 20, a conductive terminal 30, and a signal terminal 40. The main body 10 includes an opening end 11, a sleeved end 12 and a hollow portion 13. The opening end 11 and the sleeved end 12 are opposite to each other, and the electronic device end 9 is matched and connected with the connector 1 through the opening end 11. Namely, the sleeve 92 of the electronic device end 9 passes through the opening end 11 of the connector 1, so as to interfere with the main body 10 of the connector 1 and abut against one end of the sleeving component 20. In the embodiment, the sleeving component 20 is slidably connected to the main body 10 and disposed on the sleeved end 12 of the main body 10. Moreover, the sleeving component 20 includes an accommodation space 21, a conductive contact portion 22 and a signal contact portion 23. In the embodiment, the sleeved end 12 of the main body, the conductive contact portion 22 and the signal contact portion 23 are accommodated in the accommodation space 21. Moreover, the conductive contact portion 22 and the signal contact portion 23 are fixed to the sleeving component 20 in parallel along the first direction (i.e., the X axial direction), respectively. In the embodiment, the conductive terminal 30 is fixed to the main body 10 along the first direction (i.e., the X axial direction), and accommodated in the hollow portion 13. The conductive terminal 30 further includes a conductive connection end 31 extended to the accommodation space 21 through the sleeved end 12 and connected to the conductive contact portion 22. In the embodiment, the signal terminal 40 is fixed to the main body 10 along the first direction (i.e., the X axial direction), and accommodated in the hollow portion 13. In the embodiment, the signal terminal 40 includes a signal connection end 41 extended to the accommodation space 21 through the sleeved end 12 and detachably connected to the signal contact portion 23. When the connector 1 is detached and separated from the electronic device end 9, the sleeving component 20 is displaced relative to the main body 10 along the first direction, the signal contact portion 23 is driven to separate from the signal connection end 41, and the conductive connection end 31 and the conductive contact portion 22 are maintained in an electrical connection, as shown in FIG. 4. Preferably but not exclusively, in the embodiment, a length of the conductive contact portion 22 and a length of the signal contact portion 23 are equal to each other, and a length of the conductive connection end 31 is greater than a length of the signal connection end 41. In that, when the sleeving component 20 is slide relative to the main body 10 and the signal connection end 41 is driven to separate from the signal contact portion 23, a part of the conductive connection end 31 is maintained in the electrical connection with the conductive contact portion 22. Certainly, the present disclosure is not limited thereto.

In the embodiment, the conductive terminal 30 is for example but not limited to the VBUS or GND conductive terminal. Preferably but not exclusively, the conductive terminal 30 is made of a metal sheet, set on the main body 10 and disposed in the hollow portion 13. The conductive terminal 30 includes a conductive elastic-clamping arm disposed along the first direction (i.e., the X axial direction). The conductive elastic-clamping arm and the conductive connection end 31 are disposed at two opposite ends. When the connector 1 and the electronic device end 9 are matched with each other, the conductive elastic-clamping arm is configured to interfere with the tongue 91 of the electronic device end 9. Similarly, the signal terminal 40 is made by a metal sheet, set on the main body 10 and disposed in the hollow portion 13. The signal terminal 40 includes a signal elastic-clamping arm disposed along the first direction (i.e., the X axial direction). The signal elastic-clamping arm and the signal connection end 41 are disposed at two opposite ends. When the connector 1 and the electronic device end 9 are matched with each other, the signal elastic-clamping arm is configured to interfere with the tongue 91 of the electronic device end 9. Notably, the electronic device end 9 further includes a plurality of contact pins formed on the tongue 91 in the form of gold fingers on a printed circuit board. When the main body 10 of the connector 1 and the sleeve 92 of the electronic device end 9 are matched and interfered with each other, the tongue 91 is clamped by the conductive elastic-clamping arm of the conductive terminal 30 and the signal elastic-clamping arm of the signal terminal 40, respectively, so that a clamping force is formed between the connector 1 and the electronic device end 9. In order to detach the connection between the connector 1 and the electronic device end 9, a pull-out force needs to be applied to overcome the clamping force formed between the connector 1 and the electronic device end 9. When the pull-out force acts on the sleeving component 20 along the first direction (i.e., the X axial direction), the sleeving component 20 is slid relative to the main body 10 along the first direction, the conductive connection end 31 and the conductive contact portion 22 are maintained in the electrical connection while the signal contact portion 23 is separated from the signal connection end 41, and then the conductive elastic-clamping arm and the signal elastic-clamping arm are separated from the tongue 91. That is, the pull-out force must be greater than the clamping force. In addition, when the connector 1 is matched and connected with the electronic device end 9, the plurality of contact pins are in accordance with the conductive terminal 30 and the signal terminal 40 to form the electrical connection, respectively. However, it is not an essential feature of the present disclosure. The present disclosure is not limited thereto, and not redundantly described hereafter.

In the embodiment, the connector 1 further includes a first engaging element 411 and a second engaging element 231 spatially corresponding to each other. Preferably but not exclusively, the first engaging element 411 is a hook, disposed on the signal connection end 41 and located adjacent to the sleeved end 12. In another embodiment, the first engaging element 411 is formed at the end of the signal connection end 41. The second engaging element 231 is a slot, disposed on the signal contact portion 23, and accommodated in the accommodation space 21. When the connector 1 and the electronic device end 9 are connected with each other, the first engaging element 411 and the second engaging element 231 are engaged with each other to form an engagement force, so as to maintain the electrical connection between signal connection end 41 and the signal contact portion 23. Preferably but not exclusively, in other embodiments, the first engaging element 411 is a slot, disposed on the signal connection end 41 and located adjacent to the sleeved end 12. The second engaging element 231 is a hook, disposed on the signal contact portion 23. In another embodiment, the second engaging element 231 is formed at the end of the signal contact portion 23. The present disclosure is not limited thereto. In the embodiment, the engagement force formed between the first engaging element 411 and the second engaging element 231 is smaller than the clamping force formed between the connector 1 and the electronic device end 9. Therefore, when a pull-out force is applied on the sleeving component 20 of the connector 1 by the user to detach the connector 1 from the electronic device end 9, the sleeving component 20 is displaced in the first direction (i.e., the X axial direction) relative to the main body 10, the signal contact portion 23 is separated from the signal connection end 41, and the conductive connection end 31 and the conductive contact portion 22 are maintained in the electrical connection, as shown in FIG. 4. Thereafter, the main body 10 is further driven by the sleeving component 20 of the connector 1, so as to detach the main body 10 from the tongue 91 of the electronic device end 9.

Notably, when a pull-out force is applied on the sleeving component 20 of the connector 1 to pull out the connector 1 along the first direction (i.e., the X axial direction) by the user, the engagement force formed between the first engaging element 411 and the second engaging element 231 is overcame by the pull-out force of the user overcomes firstly, and the sleeving component 20 is displaced relative the main body 10 along the first direction (i.e., the X axial direction) at a sliding distance D, as shown in FIG. 5. When the sleeving component 20 of the connector 1 is separated from the electronic device end 9 by the pull-out force, the sleeving component 20 of the connector 1 is not interfered with the sleeve 92 of the electronic device end 9. At this time, the signal contact portion 23 disposed on the sleeving component 20 and the signal terminal 40 disposed on the main body 10 are separated while the sleeving component 20 is slid relative to the main body 10 at the sliding distance D, and a spaced distance G is formed between the signal contact portion 23 and the signal connection end 41. In the embodiment, the sliding distance D is greater than the spaced distance G. When the connector 1 is matched and connected with the electronic device end 9, it ensures that the signal contact portion 23 and the signal connection end 41 are engaged with each other to form the electrical connection again. Moreover, in the embodiment, a length of the conductive connection end 31 is greater than a length of the signal connection end 41, and the difference of the lengths of the conductive connection end 31 and the signal connection end 41 is greater than the spaced distance G. When the signal contact portion 23 disposed on the sleeving component 20 and the signal connection end 41 disposed on the main body 10 are separated due to the relative displacement of the sleeving component 20 and the main body 10, the conductive connection end 31 and the conductive contact portion 22 are maintained in contact and the electrical connection. Since the electronic device end 9 is interfered and connected with the main body 10, the electrical connection of the signal contact portion 23 and the electronic device end 9 is disconnected by the relative displacement of the sleeving component 20 and the main body 10, but the electrical connection of the conductive contact portion 22 and the electronic device end 9 is not affected. Afterward, the main body 10 is separated from the electronic device end 9 by the pull-out force of the user, and the electrical connection of the conductive contact portion 22 and the electronic device end 9 is disconnected. In other words, in the plugging operation or unplugging operation of the connector 1 relative to the electronic device end 9, the conductive contact portion 22 and the signal contact portion 23 are controlled to achieve the electrical connection and disconnection at different timings through the relative displacement of the sleeving component 20 and the main body 10.

From the above, the relative displacement of the sleeving component 20 and the main body 10 of the connector 1 is utilized to control the electrical connection and the disconnection sequences of the conductive contact portion 22 and the signal contact portion 23 with the electronic device end 9. When the connector 1 is pulled to separate from the electronic device end 9 through the sleeving component 20, the signal contact portion 23 and the electronic device end 9 is disconnected firstly, and the conductive contact portion 22 (VBUS and GND) and the electronic device end 9 are maintained in the electrical connection. At this time, it is allowed to step down or stop the voltage transmitted between the connector 1 and the electronic device end 9 in advance according to the signal disconnection. Thereafter, when the main body 10 of the connector 1 and the electronic device end 9 are separated and disconnected, the potential of the voltage transmitted between the conductive terminal 30 and the plurality of contact pins of the electronic device end 9 has been less than a certain degree. It has advantages of avoiding the occurrence of the electric arc during hot swapping, avoiding the formation of the carbon deposition due to the electric arc, prolonging the service life of the connector 1 and solving the safety problems in use. The step-down mechanism for the connector 1 and the electronic device end 9 is further described as follows.

Figure 6:
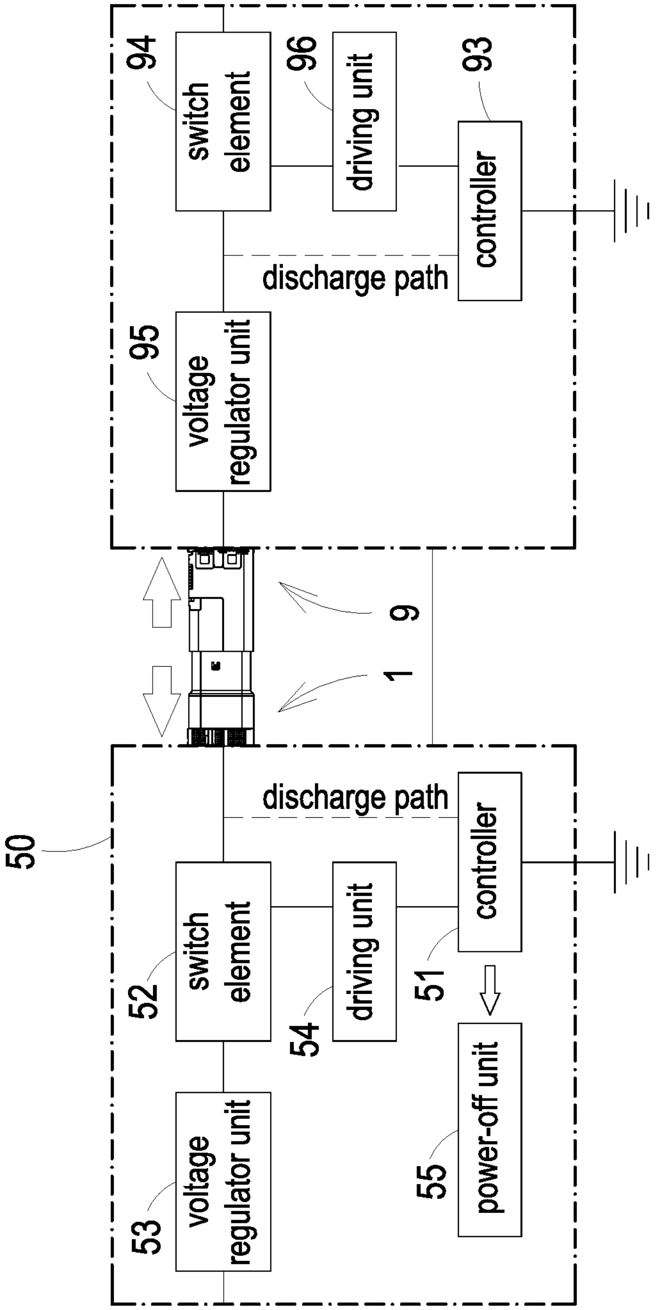
FIG. 6 is a block diagram showing a step-down mechanism for the connector and the electronic device end according to the first embodiment of the present disclosure.

FIG. 6 is a block diagram showing a step-down mechanism for the connector and the electronic device end according to the first embodiment of the present disclosure. Please refer to FIG. 1A to FIG. 6. In the embodiment, the connector 1 is connected to for example a power supply system 50, and an output voltage from the power supply system 50 is received by the electronic device end 9 through the connector 1. Preferably but not exclusively, the voltage output transmitted between the power supply system 50, such as a power supply device served as the source, and the electronic device end 9, such as computer and a mobile device served as the sink is performed based on the USB PD protocol. In this way, the power supply system 50 served as the source is allowed to provide a high-power output voltage to the electronic device end 9 through the connection of the connector 1. In the embodiment, the power supply system 50 includes a controller 51, a switch element 52, a voltage regulator unit 53, a driving unit 54 and a power-off unit 55. The controller 51 is electrically connected to the switch element 52 through the driving unit 54, the switch element 52 is electrically connected to the voltage regulator unit 53, and the power-off unit 55 is electrically connected to the controller 51. The controller 51 is allowed to control the switch element 52 through the driving unit 54, so as to transmit an output voltage, and the output voltage is transmitted to the electronic device end 9 through the connector 1. The stability of the output voltage is maintained by the voltage regulator unit 53. On the other hand, the electronic device end 9 includes a controller 93, a switch element 94, a voltage regulator unit 95 and a driving unit 96. The controller 93 is electrically connected to the switch element 94 through the driving unit 96, and the switch element 94 is electrically connected to the voltage regulator unit 95. The controller 93 is allowed to control the switch element 94 through the driving unit 96, so as to receive and transmit the output voltage from the connector 1.

Preferably but not exclusively, the connector 1 is a USB Type-C connector. The signal terminal 40 of the connector 1 is electrically connected to the controller 51 through the signal contact portion 23, and the contact pin of the electronic device end 9 corresponding to the signal terminal 40 is electrically connected to the controller 93. The connector 1 is allowed to output a communication message to the electronic device end 9 through the connection between the signal terminal 40 and the corresponding contact pin of the electronic device end 9. In addition, the power supply system 50 is allowed to transmit an output voltage to the electronic device end 9 through the conductive contact portion 22 and the conductive connection end 31 of the connector 1. When the user provides a pull-out force to act on the sleeving component 20 of the connector 1 for detaching the connector 1 from the electronic device end 9, the sleeving component 20 is slid relative to the main body 10 along the first direction (i.e., the X axial direction). In that, the signal contact portion 23 is driven to separate from the signal connection end 41, while the conductive connection end 31 and the conductive contact portion 22 are maintained in the electrical connection, as shown in FIG. 4. At this time, the controller 51 of the power supply system 50 steps down the output voltage through the power-off unit 55 according to the message that the signal terminal 40 is disconnected from the electronic device end 9, so that the output voltage is discharged through a discharge path. In other embodiments, the output voltage is transmitted from the power supply system 50 to the electronic device end 9 through the connector 1 in a non-PD protocol. When the main body 10 and the sleeving component 20 of the connector 1 are detached together from the electronic device end 9 along the first direction (i.e., the X axial direction), the sleeving component 20 of the connector 1 is separated to disconnect the signal contact portion 23 and the signal terminal 40 in advance, so that the signal contact portion 23 is disconnected from the electronic device end 9, and the conductive contact portion 22 and the electronic device end 9 are still maintained in the electrical connection. At this time, the controller 51 of the power supply system 50 stops the output voltage through the power-off unit 55 according to the message that the signal contact portion 23 is disconnected from the electronic device end 9. Certainly, the electronic device end 9 connected to the connector 1 is allow to discharge through a discharge path. Preferably but not exclusively, in the embodiment, the power-off unit 55 is at least one selected from the group consisting of a controller, an amplifier, a resistor and a capacitor. Preferably but not exclusively, the switch element 52 and the switch element 94 are a metal oxide semiconductor field effect transistor (MOSFET) or a bipolar junction transistor (BJT). In an embodiment, the power-off unit 55 of the connector 1 with PD protocol is omitted. When the sleeving component 20 is slid relative to the main body 10 along the first direction (i.e., the X axial direction), the signal contact portion 23 is driven to separate from the signal connection end 41, while the conductive connection end 31 and the conductive contact portion 22 are maintained in the electrical connection. At this time, the controller 51 of the power supply system 50 is allowed to notify the driving unit 54 to turn off the switch element 52 according to the message that the signal terminal 40 is disconnected from the electronic device end 9 to step down the output voltage, so that the output voltage is discharged through the discharge path. Certainly, the present disclosure is not limited thereto. In other embodiments, the controller 93 of the electronic device end 9 is also allowed to notify the driving unit 96 to turn off the switch element 94 according to the message that the contact pin of the electronic device end 9 corresponding to the signal terminal 40 is disconnected from the connector 1, so that an input voltage of the electronic device end 9 is discharged through a discharge path.

Figure 7:
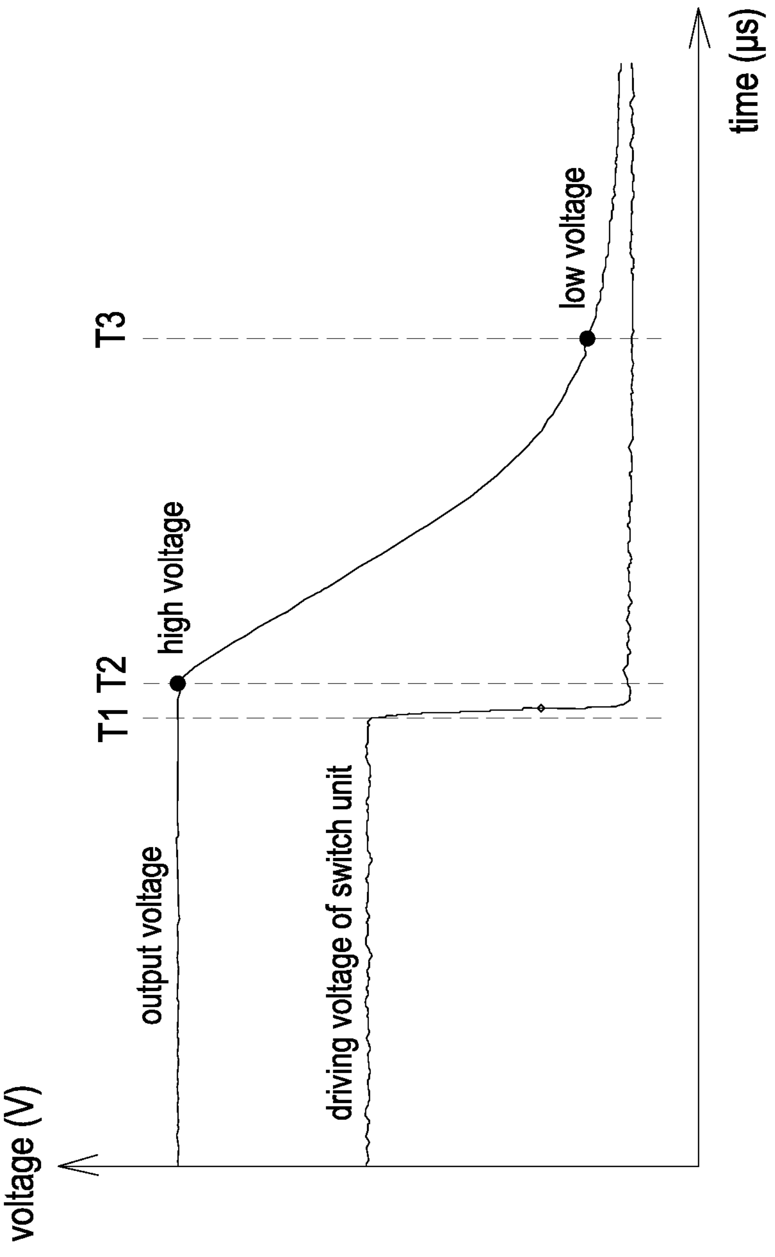
FIG. 7 is a diagram showing the relationship between voltages and timings in the step-down mechanism for the connector and the electronic device end according to the first embodiment of the present disclosure.

FIG. 7 is a diagram showing the relationship between voltages and timings in the step-down mechanism for the connector and the electronic device end according to the first embodiment of the present disclosure. In the embodiment, when the sleeving component 20 is slid relative to the main body 10 along the first direction (i.e., the X axial direction), the signal contact portion 23 is driven to separate from the signal connection end 41, and the signal contact portion 23 is disconnected from the electronic device end 9 at the timing T1, while the conductive contact portion 22 is still electrically connected with the electronic device end 9. At this time, the controller 51 of the power supply system 50 connected to the connector 1 starts to control the output voltage to be stepped down at the timing T2 according to the message that the signal contact portion 23 is disconnected from the electronic device end 9. The output voltage is stepped down from a high voltage such as 40V at the timing T2, and reduced to a low voltage range such as less than 5V at the timing T3. The time sequence from the timing T2 to the timing T3 is only a few microseconds (μs), which is much smaller than the displacement time of the main body 10 of the connector 1 relative to the tongue 91 when the connector 1 is pulled out from the electronic device end 9. Therefore, in the present disclosure, the relative displacement of the sleeving component 20 and the main body 10 of the connector 1 is utilized to control the disconnection sequences of the signal contact portion 23 and the conductive contact portion 22 with the electronic device end 9. When the connector 1 is pulled to separate from the electronic device end 9 through the sleeving component 20, the signal contact portion 23 and the electronic device end 9 is disconnected firstly, and the conductive contact portion 22 and the electronic device end 9 are maintained in the electrical connection. At this time, it is allowed to step down or stop the voltage transmitted between the connector 1 and the electronic device end 9 in advance. Then, when the main body 10 of the connector 1 and the electronic device end 9 are separated and disconnected, the potential of the voltage transmitted between the conductive contact portion 22 and the electronic device end 9 has been less than a certain degree. It has advantages of avoiding the occurrence of the electric arc during hot swapping, avoiding the formation of the carbon deposition due to the electric arc, prolonging the service life of the connector 1 and solving the safety problems in use.

Figure 8A:
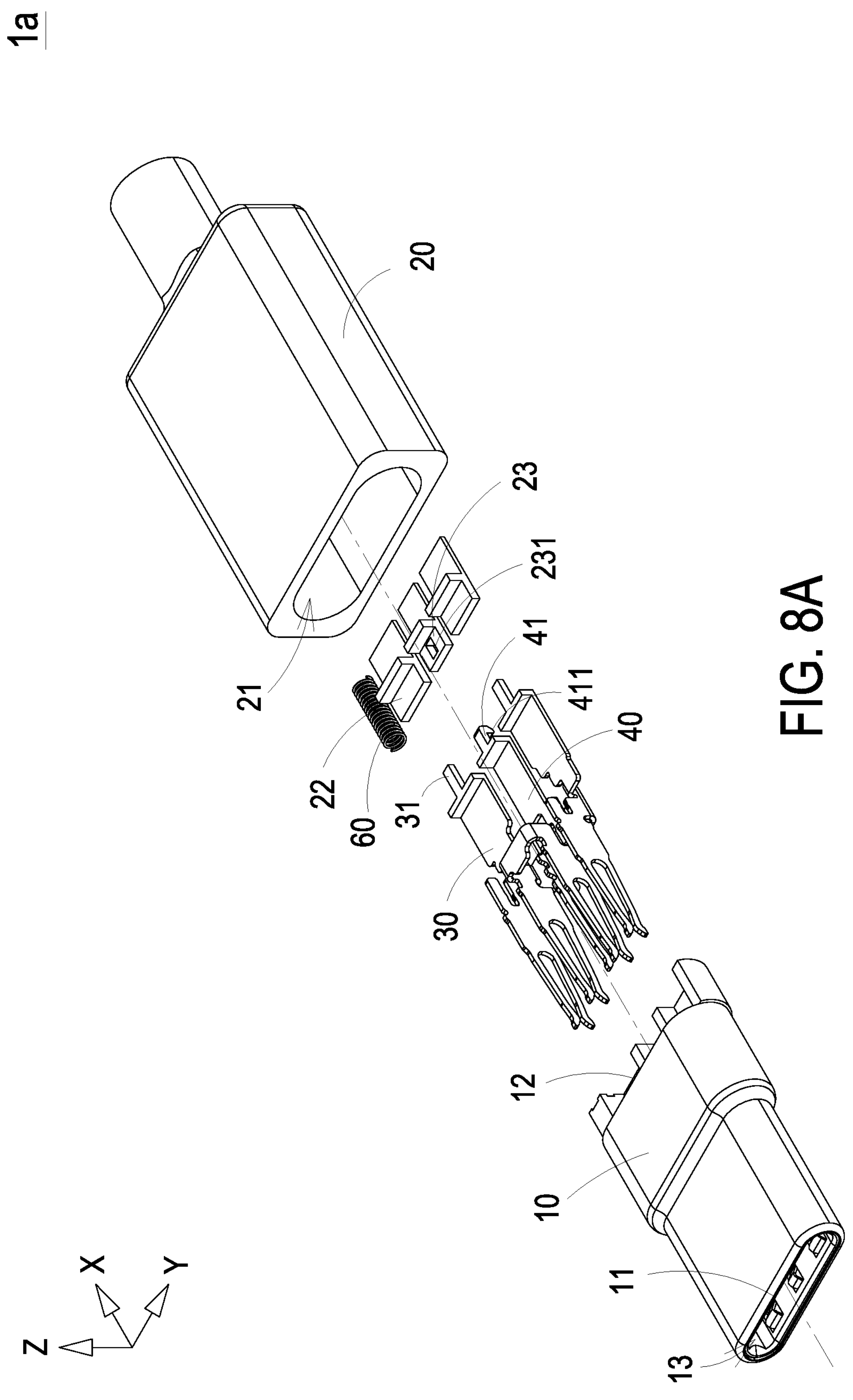
FIG. 8A is an exploded view illustrating a connector according to a second embodiment of the present disclosure.
Figure 8B:
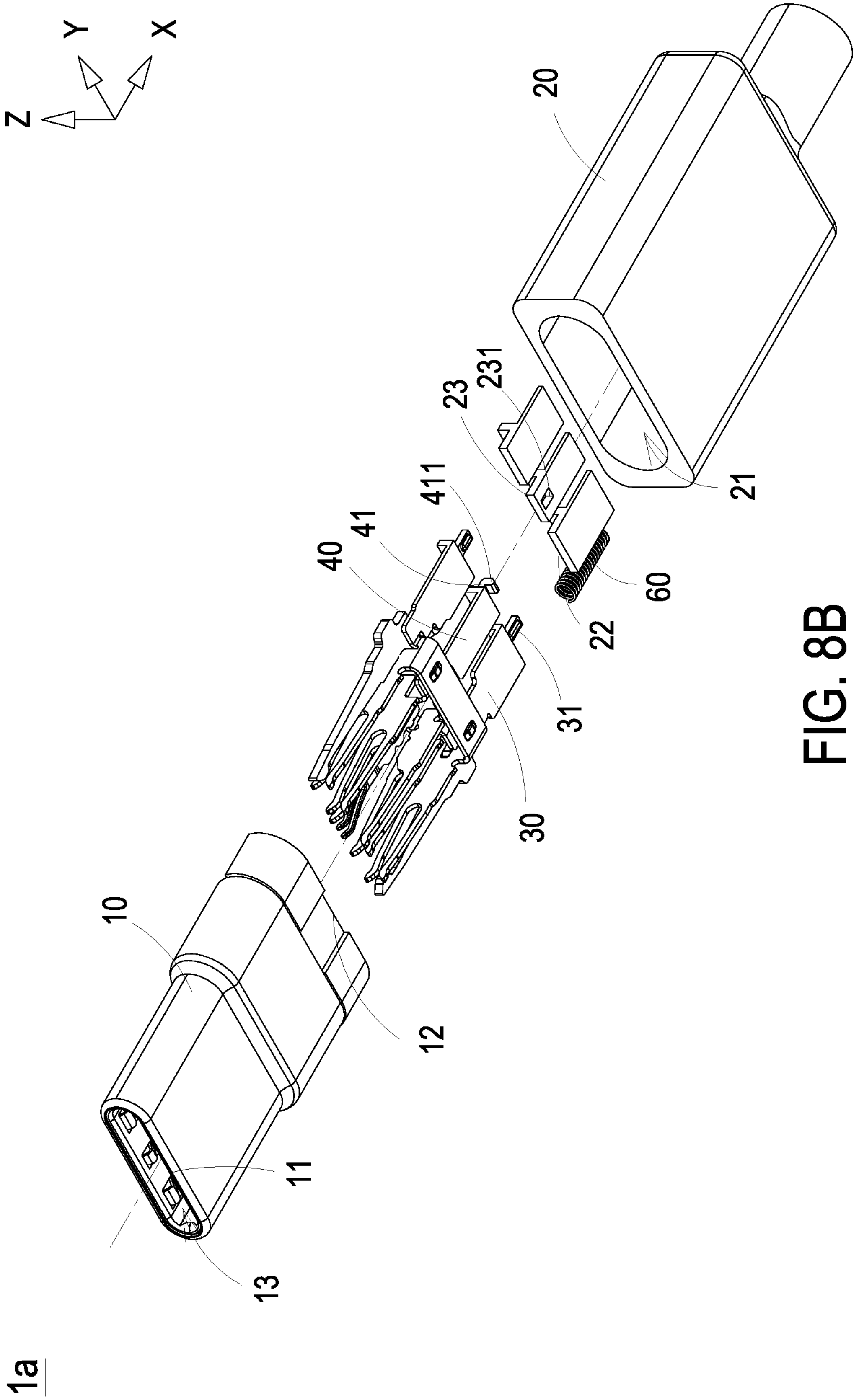
FIG. 8B is an exploded view illustrating the connector according to the second embodiment of the present disclosure and taken from another perspective.
Figure 9:
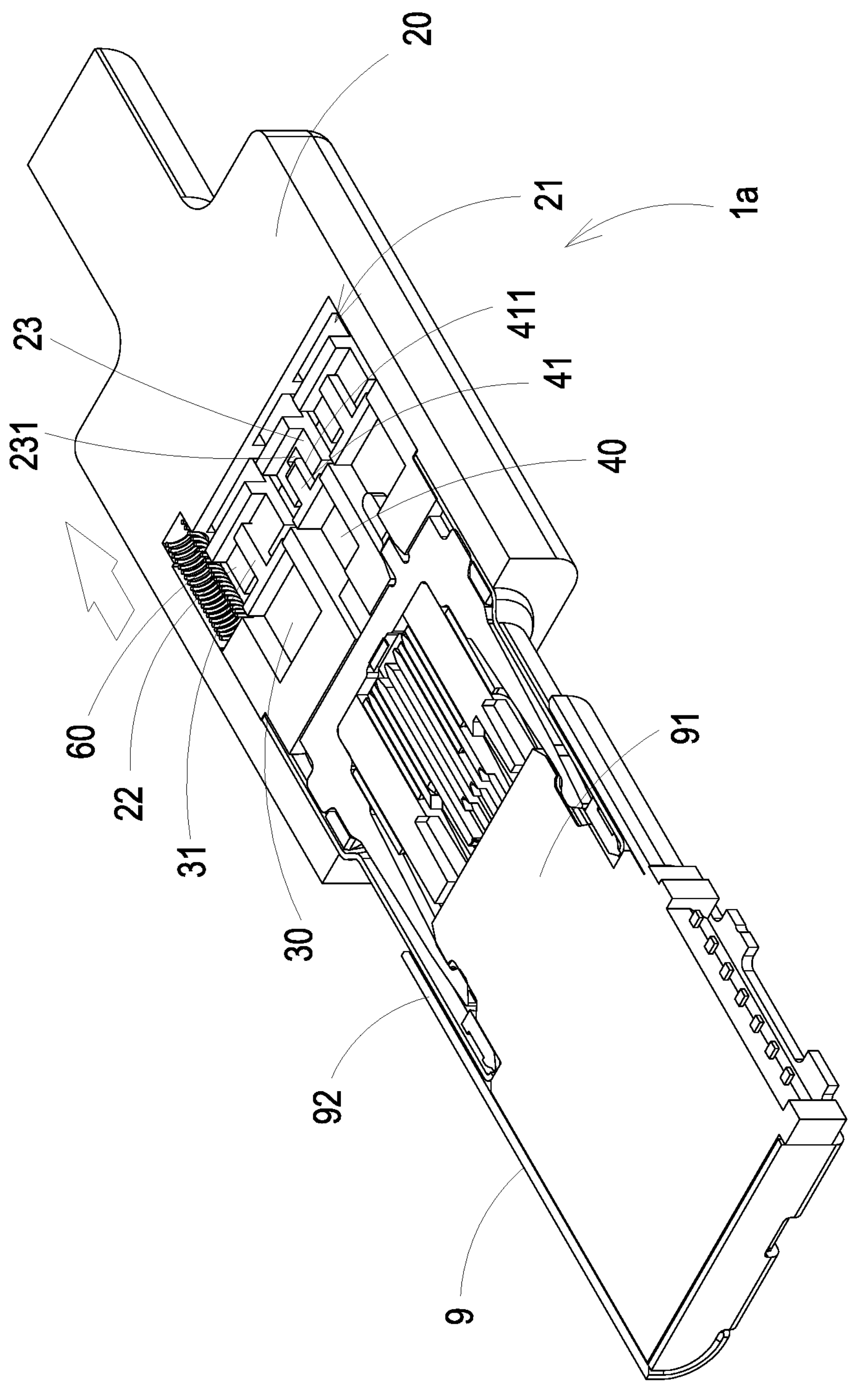
FIG. 9 is a cross-section structural view illustrating the sleeving component not slid relative to the main body when the connector is detached from the electronic device end according to the second embodiment of the present disclosure.
Figure 10:
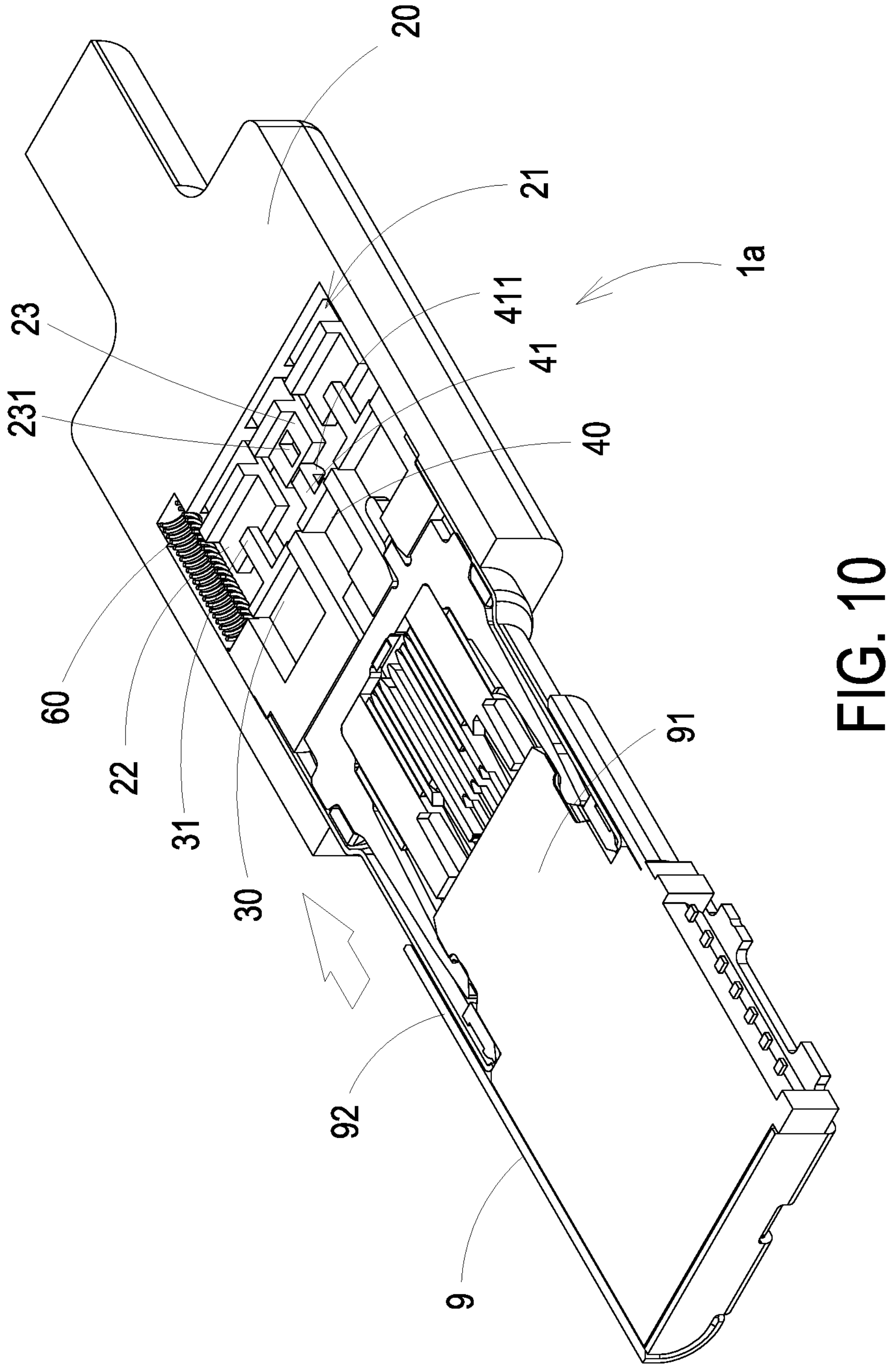
FIG. 10 is a cross-section structural view illustrating the sleeving component slide relative to the main body when the connector is detached from the electronic device end according to the second embodiment of the present disclosure.

FIGS. 8A and 8B are exploded views illustrating a connector according to a second embodiment of the present disclosure. FIG. 9 is a cross-section structural view illustrating the sleeving component not slid relative to the main body when the connector is detached from the electronic device end according to the second embodiment of the present disclosure. FIG. 10 is a cross-section structural view illustrating the sleeving component slide relative to the main body when the connector is detached from the electronic device end according to the second embodiment of the present disclosure. In the embodiment, the structures, elements and functions of the connector 1*a* are similar to those of the connector 1 of FIG. 1A to FIG. 6, and are not redundantly described herein. In the embodiment, the connector 1*a* further includes an elastic element 60 having two ends fixed to main body 10 and the sleeving component 20. Preferably but not exclusively, the elastic element 60 is accommodated in the accommodation space 21. When the connector 1*a* is detached and separated from the electronic device end 9, an elastic restoring force is provided by the elastic element 60, and the sleeving component 20 is pushed and separated away from the main body 10. In that, the signal contact portion 23 disposed on the sleeving component 20 and the signal connection end 41 disposed on the main body 10 are maintained in a normal separation state. In the embodiment, the elastic restoring force is less than the engagement force formed between the first engaging element 411 and the second engaging element 231. When the connector 1*a* is matched and connected with the electronic device end 9, a stable connection between the signal contact portion 23 disposed on the sleeving component 20 and the signal connection end 41 disposed on the main body 10 is maintained by the engaging force formed between the first engaging element 411 and the second engaging element 231. In other embodiments, the types and the positions of the first engaging element 411 and the second engaging element 231 are adjustable according to the practical requirements. Certainly, the present disclosure is not limited thereto.

Figure 11A:
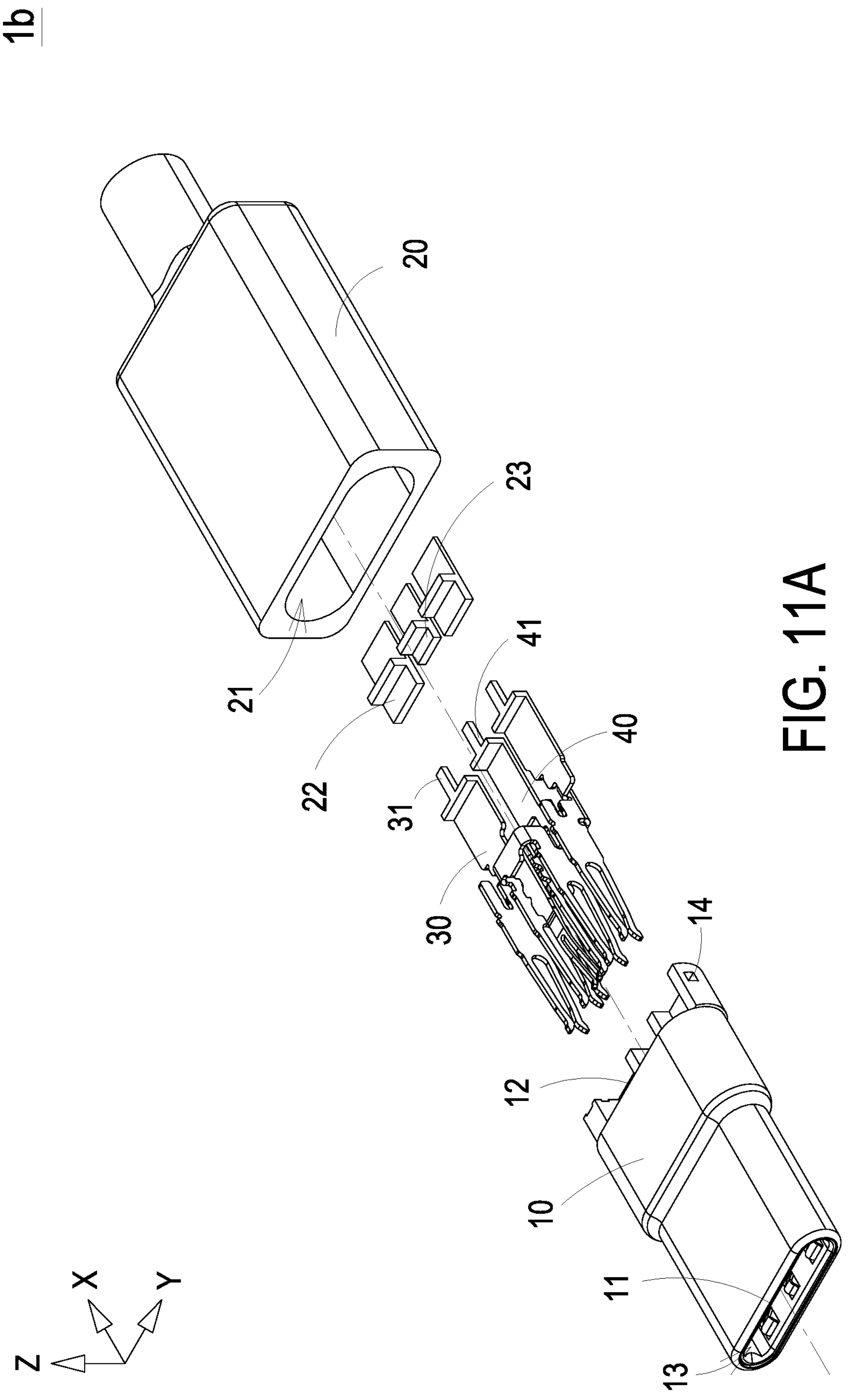
FIG. 11A is an exploded view illustrating a connector according to a third embodiment of the present disclosure.
Figure 11B:
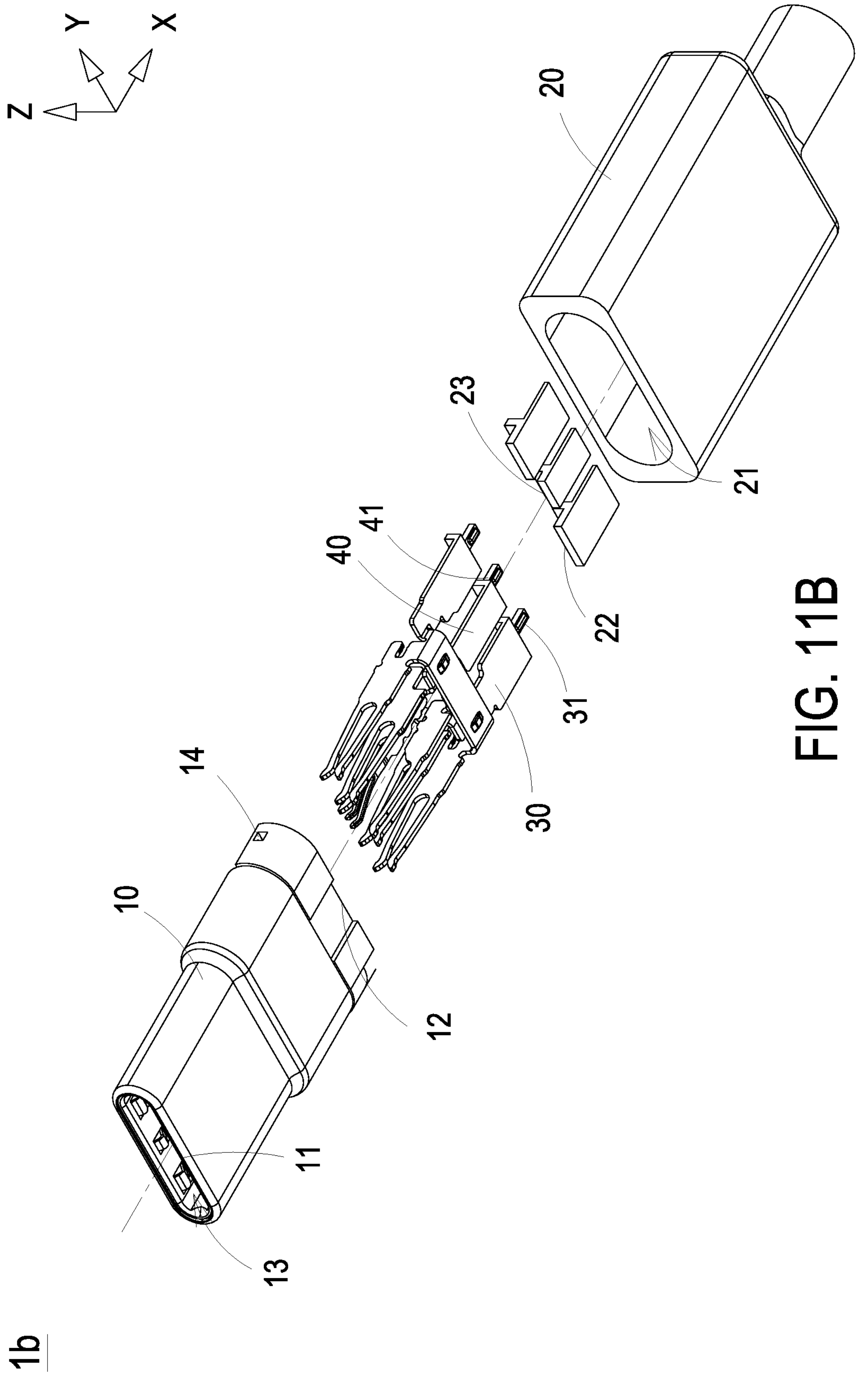
FIG. 11B is an exploded view illustrating the connector according to the third embodiment of the present disclosure and taken from another perspective.
Figure 12:
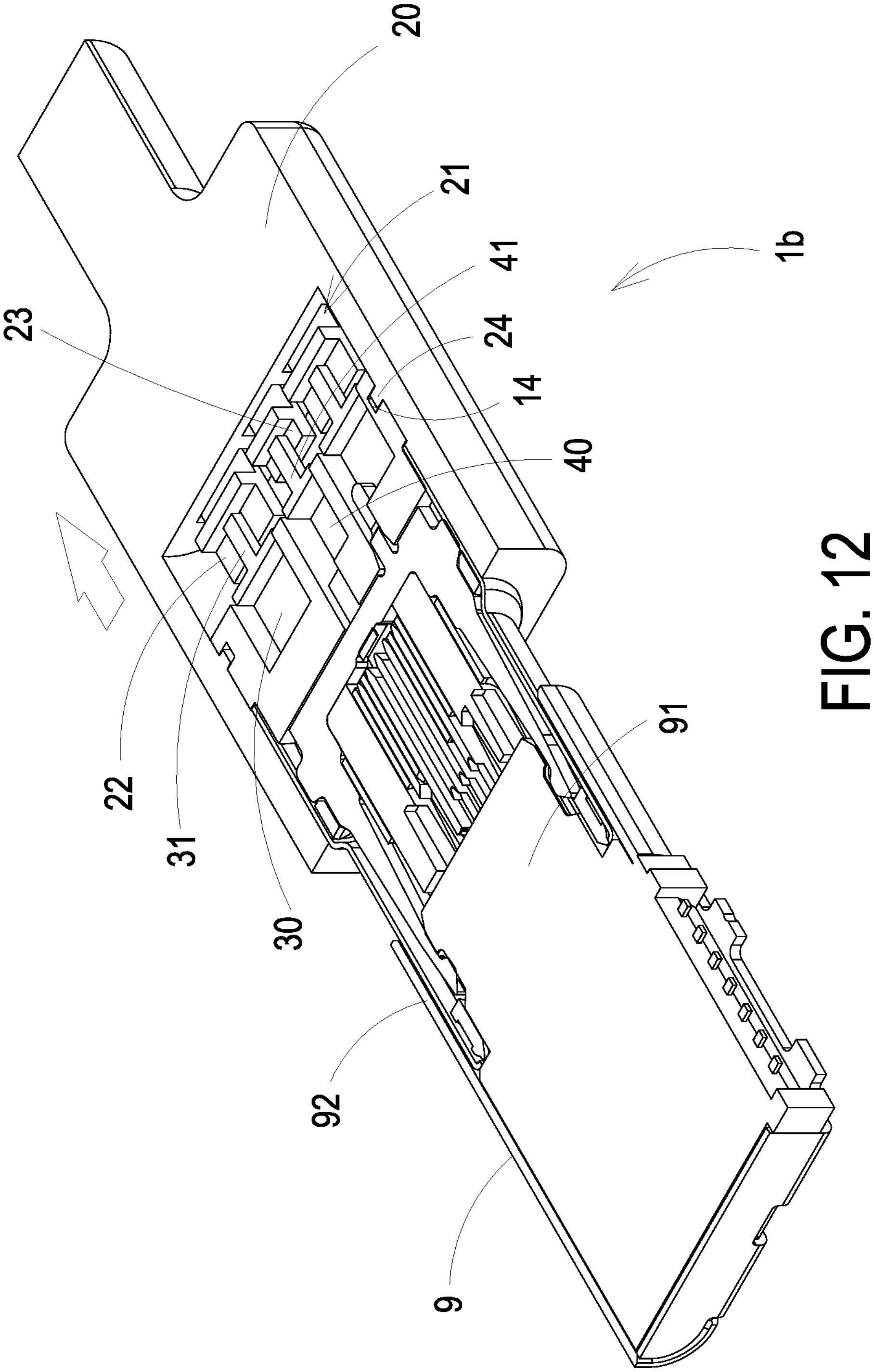
FIG. 12 is a cross-section structural view illustrating the sleeving component not slid relative to the main body when the connector is detached from the electronic device end according to the third embodiment of the present disclosure.
Figure 13:
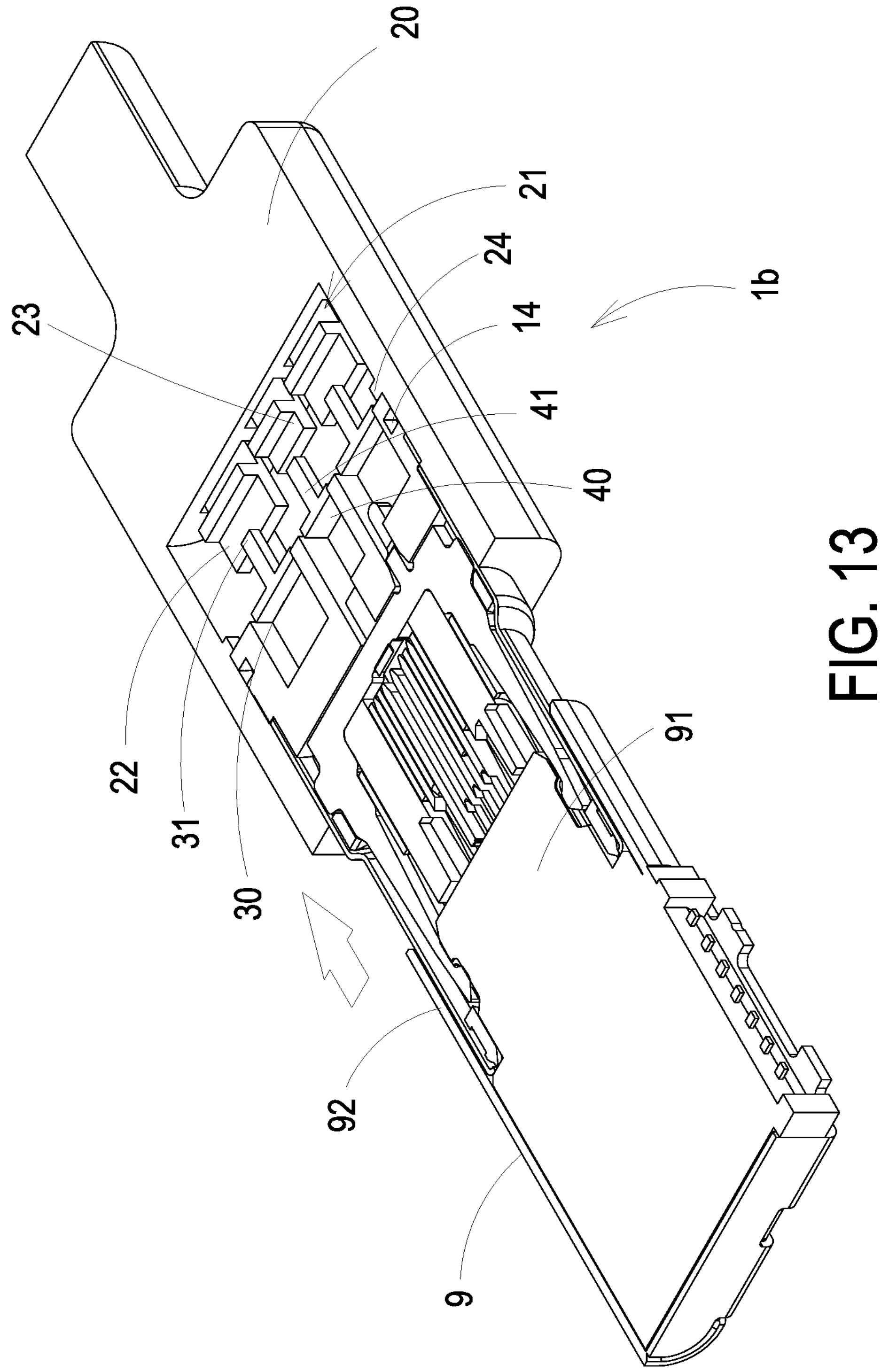
FIG. 13 is a cross-section structural view illustrating the sleeving component slide relative to the main body when the connector is detached from the electronic device end according to the third embodiment of the present disclosure.

FIGS. 11A and 11B are exploded views illustrating a connector according to a third embodiment of the present disclosure. FIG. 12 is a cross-section structural view illustrating the sleeving component not slid relative to the main body when the connector is detached from the electronic device end according to the third embodiment of the present disclosure. FIG. 13 is a cross-section structural view illustrating the sleeving component slide relative to the main body when the connector is detached from the electronic device end according to the third embodiment of the present disclosure. In the embodiment, the structures, elements and functions of the connector 1*b* are similar to those of the connector 1 of FIG. 1A to FIG. 6, and are not redundantly described herein. In the embodiment, the connector 1*b* includes a first engaging element 14 and a second engaging element 24 spatially corresponding to each other. Preferably but not exclusively, the first engaging element 14 is a convex portion, disposed on a peripheral wall of the sleeved end 12. The second engaging element 24 is a concave portion, disposed on an inner wall of the sleeving component 20 and accommodated in the accommodation space 21. The present disclosure is not limited thereto. In the embodiment, when the connector 1*b* and the electronic device end 9 are connected with each other, the first engaging element 14 and the second engaging element 24 are engaged with each other to form an engagement force, so as to maintain the electrical connection between signal connection end 41 and the signal contact portion 23. Preferably but not exclusively, in other embodiments, the first engaging element 14 is a concave portion, disposed on a peripheral wall of the sleeved end 12. The second engaging element 24 is a convex portion, disposed on an inner wall of the sleeving component 20 and accommodated in the accommodation space 21. The present disclosure is not limited thereto. In the embodiment, the engagement force formed between the first engaging element 14 and the second engaging element 24 is smaller than the clamping force formed between the connector 1*b* and the electronic device end 9. In the embodiment, a length of the conductive connection end 31 and a length of the signal connection end 41 are equal to each other, a length of the conductive contact portion 22 is greater than a length of the signal contact portion 23, and the difference of the lengths of the conductive contact portion 22 and the signal contact portion 23 is greater than the spaced distance G formed between the signal contact portion 23 and the signal connection end 41. When the connector 1*b* is matched and connected with the electronic device end 9, the interference length formed between the conductive connection end 31 and the conductive contact portion 22 is greater than the interference length formed between the signal connection end 41 and the signal contact portion 23. Certainly, the present disclosure is not limited thereto. Therefore, when a pull-out force is applied on the sleeving component 20 of the connector 1*b* by the user to detach the connector 1*b* from the electronic device end 9, the sleeving component 20 is displaced in the first direction (i.e., the X axial direction) relative to the main body 10, the signal contact portion 23 is separated from the signal connection end 41, and the conductive connection end 31 and the conductive contact portion 22 are maintained in the electrical connection, as shown in FIG. 13. Thereafter, the main body 10 is further driven by the sleeving component 20 of the connector 1*b*, so as to detach the main body 10 from the sleeve 92 of the electronic device end 9. Thus, when the connector 1*b* is pulled to separate from the electronic device end 9 through the sleeving component 20, the signal contact portion 23 and the electronic device end 9 is disconnected firstly, and the conductive contact portion 22 (VBUS and GND) and the electronic device end 9 are maintained in the electrical connection. At this time, it is allowed to step down or stop the voltage transmitted between the connector 1*b* and the electronic device end 9 in advance by the controller 51 connected to the connector 1*b*. Thereafter, when the main body 10 of the connector 1*b* and the electronic device end 9 are separated and disconnected, the potential of the voltage transmitted between the conductive contact portion 22 and the plurality of contact pins of the electronic device end 9 has been less than a certain degree. It has advantages of avoiding the occurrence of the electric arc during hot swapping, avoiding the formation of the carbon deposition due to the electric arc, prolonging the service life of the connector 1*b* and solving the safety problems in use.

Figure 14A:
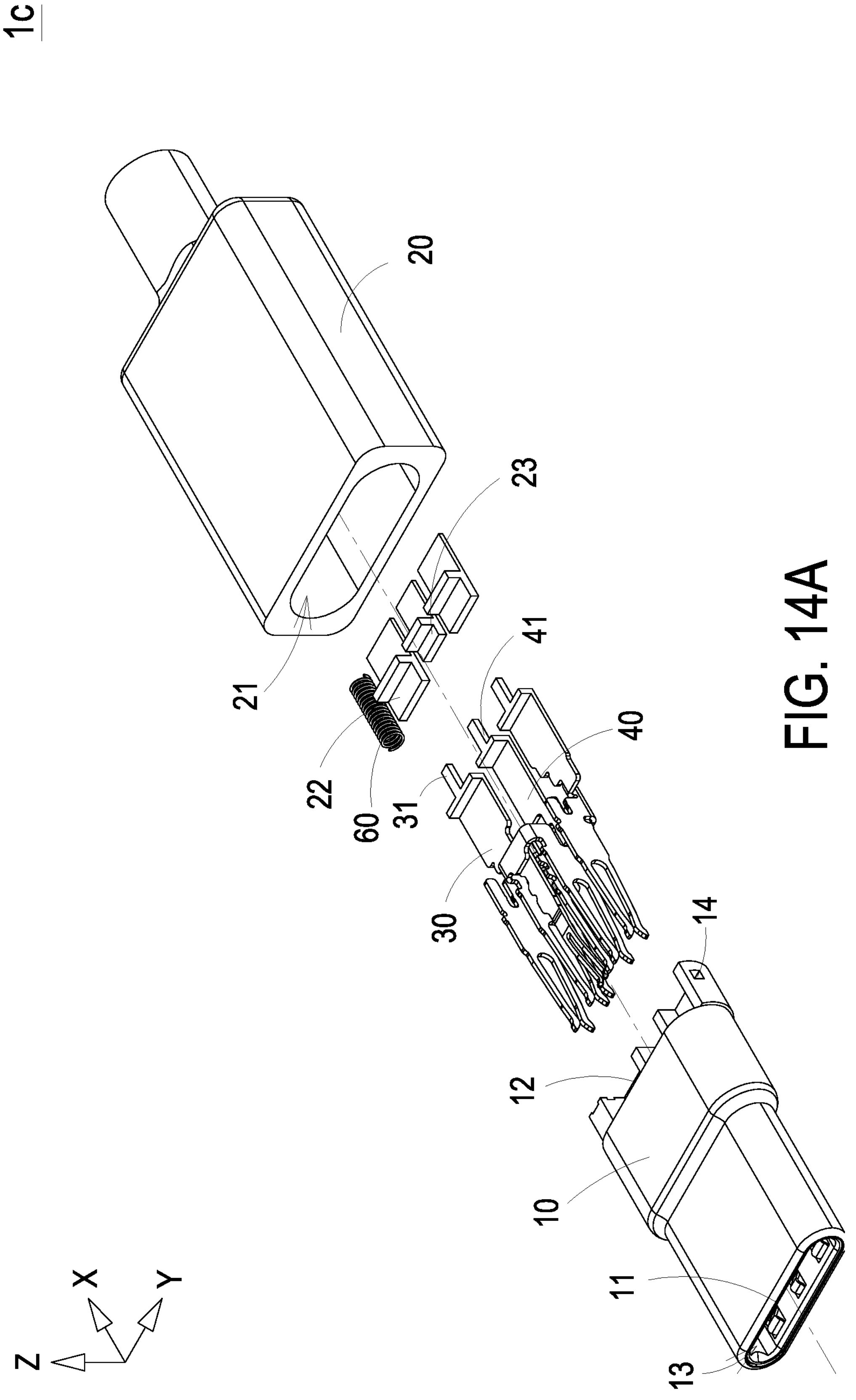
FIG. 14A is an exploded view illustrating a connector according to a fourth embodiment of the present disclosure.
Figure 14B:
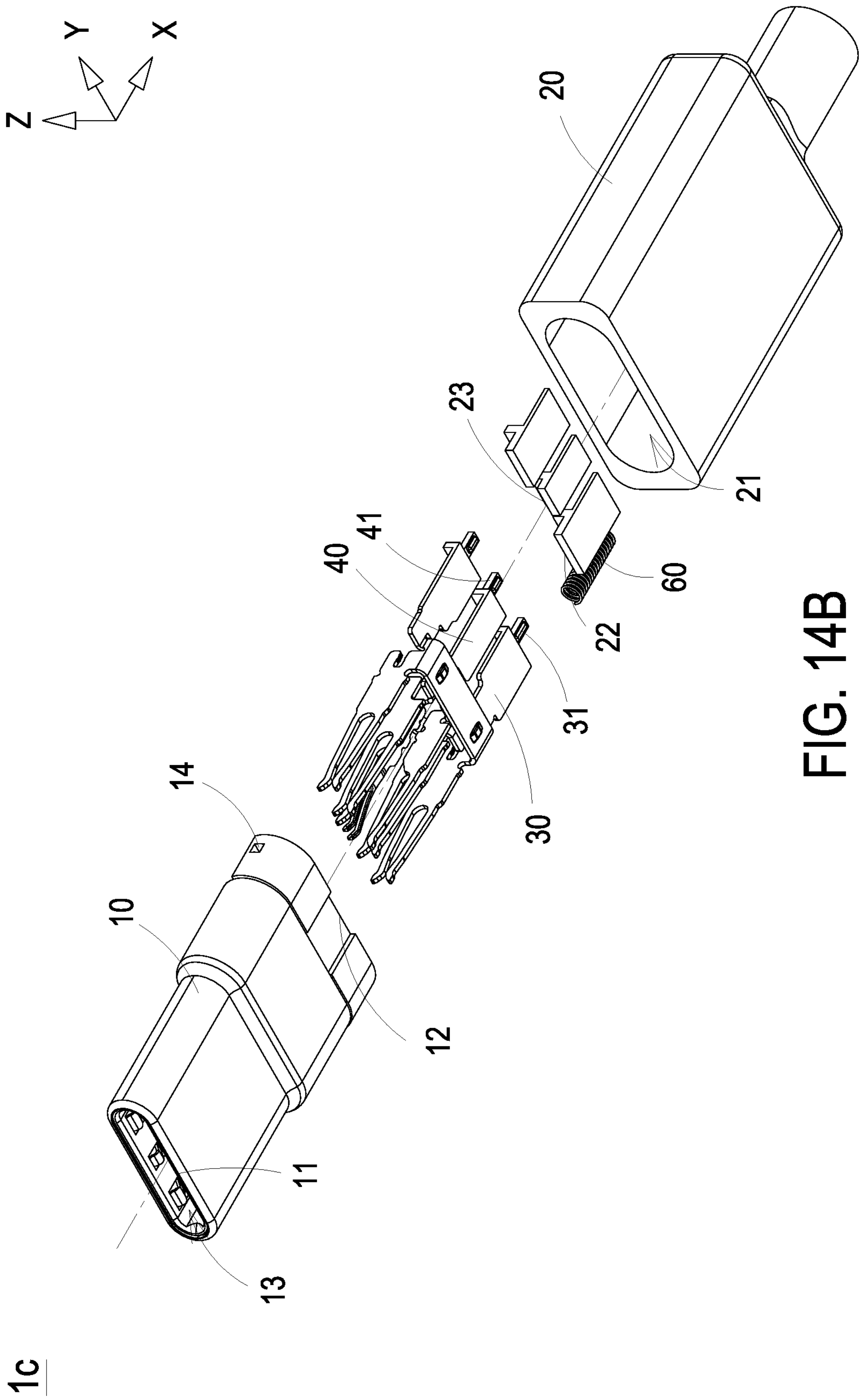
FIG. 14B is an exploded view illustrating the connector according to the fourth embodiment of the present disclosure and taken from another perspective.
Figure 15:
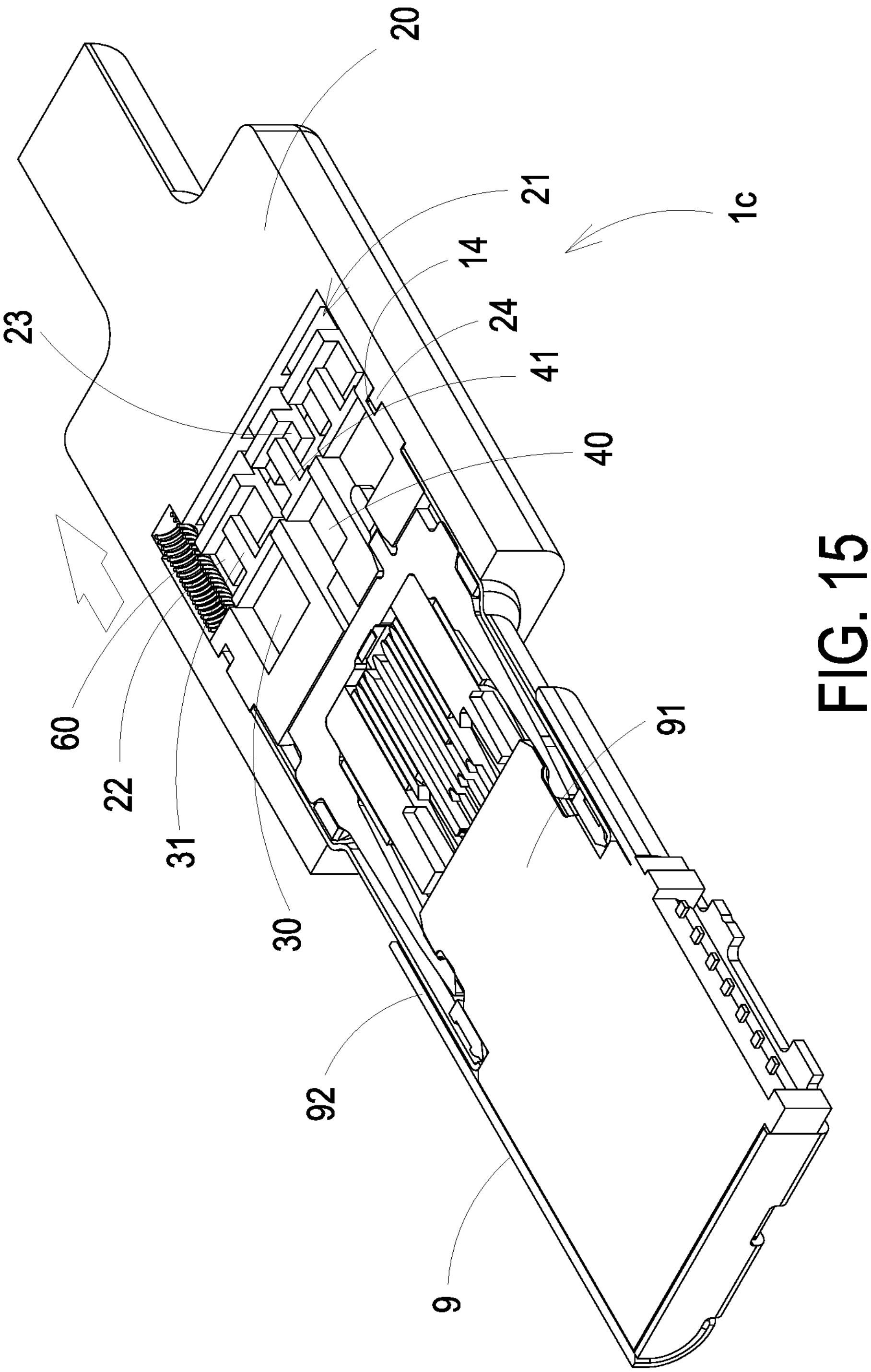
FIG. 15 is a cross-section structural view illustrating the sleeving component not slid relative to the main body when the connector is detached from the electronic device end according to the fourth embodiment of the present disclosure.
Figure 16:
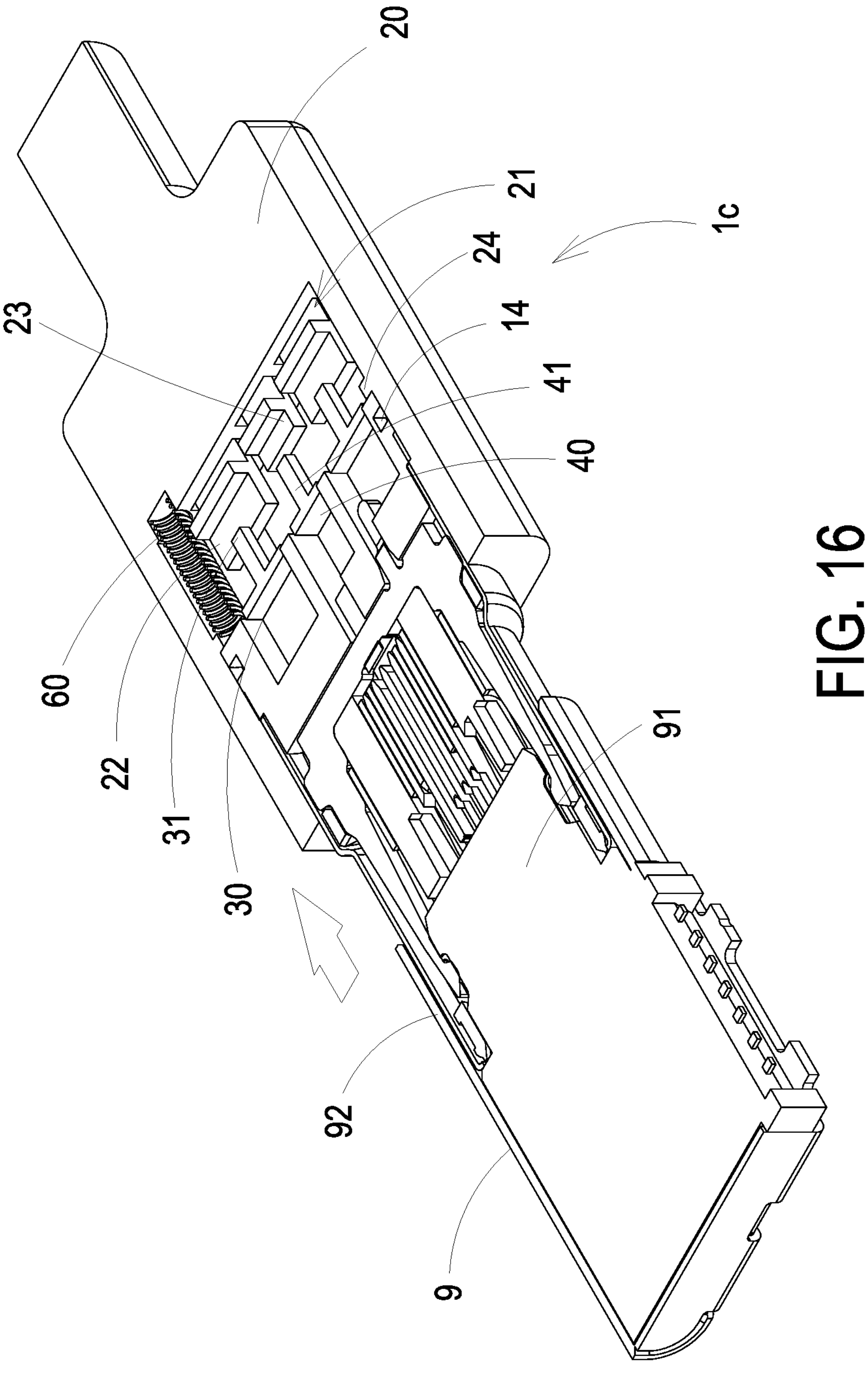
FIG. 16 is a cross-section structural view illustrating the sleeving component slide relative to the main body when the connector is detached from the electronic device end according to the fourth embodiment of the present disclosure.

FIGS. 14A and 14B are exploded views illustrating a connector according to a fourth embodiment of the present disclosure. FIG. 15 is a cross-section structural view illustrating the sleeving component not slid relative to the main body when the connector is detached from the electronic device end according to the fourth embodiment of the present disclosure. FIG. 16 is a cross-section structural view illustrating the sleeving component slide relative to the main body when the connector is detached from the electronic device end according to the fourth embodiment of the present disclosure. In the embodiment, the structures, elements and functions of the connector 1*c* are similar to those of the connector 1*b* of FIG. 11A to FIG. 13, and are not redundantly described herein. In the embodiment, the connector 1*c* further includes an elastic element 60 disposed between the main body 10 and the sleeving component 20. Preferably but not exclusively, the elastic element 60 is accommodated in the accommodation space 21. When the connector 1*c* is detached and separated from the electronic device end 9, an elastic restoring force is provided by the elastic element 60, and the sleeving component 20 is pushed and separated away from the main body 10. In that, the signal contact portion 23 disposed on the sleeving component 20 and the signal connection end 41 disposed on the main body 10 are maintained in a normal separation state. In the embodiment, the elastic restoring force provided by the elastic element 60 is less than the engagement force formed between the first engaging element 14 and the second engaging element 24. When the connector 1*c* is matched and connected with the electronic device end 9, a stable connection between the signal contact portion 23 disposed on the sleeving component 20 and the signal connection end 41 disposed on the main body 10 is maintained by the engaging force formed between the first engaging element 14 and the second engaging element 24. In other embodiments, the types and the positions of the first engaging element 14 and the second engaging element 24 are adjustable according to the practical requirements. Certainly, the present disclosure is not limited thereto.

In summary, the present disclosure provides a connector for connecting with an electronic device end. A main body and a sleeving component of the connector are designed in a slidable type, and the disconnection of the signal terminal is controlled by the pulling action of the connector being pulled away from the electronic device end. When the connector is pulled and separated from the electronic device end, the signal contact portion disposed on the sleeving component is separated from the signal terminal disposed on the main body firstly, and the conductive contact portion disposed on the sleeving component and the conductive terminal disposed on the main body end are maintained in the electrical connection. At this time, the power supply system connected to the connector controls the output voltage to be decrease or stops the output voltage in advance. Thereafter, when the connector is separated from the electronic device end completely, the potential difference between the conductive terminal and the conductive contact pin of the electronic device end is less than a certain degree. It has advantages of avoiding the occurrence of the electric arc during hot swapping, avoiding the formation of the carbon deposition due to the electric arc, so as to prolong the service life of the connector and solve the safety problems in use. With the main body and the sleeving component designed in a slidable type, when the connector is pulled and disconnected from the electronic device end through the sleeving component thereof, the sleeving component is forced to slide relative to the main body firstly. At this time, the main body is not slid relative to the electronic device end, and the conductive contact portion disposed on the sleeving component and the conductive terminal disposed on the main body are maintained in the electrical connection. However, the signal contact portion disposed on the sleeving component and the signal terminal disposed on the main body are separated due to the relative sliding distance between the sleeving component and the main body, so as to form a spaced distance. Under these conditions, a controller of a power supply system connected to the connector is allowed to determine that the connector is in the unplugging operation according to the disconnection state between the signal contact portion and the signal terminal. Moreover, at the same time, a switch element or a power-off unit is controlled to step down the output voltage or stop the output voltage, so that the output voltage is discharged through a discharge path. Thereafter, when the main body of the connecter is separated from the electronic device end completely, the output voltage between the electronic device end and the connector has been stepped down from a high level to a low level, or the output voltage is stopped. With the output voltage at the low level or stopped, the conductive terminal and the conductive contact pin of the electronic device end are disconnected, and it is not easy to cause the electric arc. At the same time, it also avoids the formation of the carbon deposition due to the electric arc, so as to prolong the service life of the connector and solve the safety problems in use. On the other hand, when the connector is connected to the electronic device end, the main body and the sleeving component slide relatively to a connection position, and the signal contact portion disposed on the sleeving component is maintained at the connection position with the signal terminal disposed on the main body through the engagement force provided by the first engaging element and a second engaging element. The first engaging element and the second engaging element are, for example, a hook and a slot disposed on the signal connection end and the signal contact portion, or a convex portion and a concave portion disposed on the main body and the sleeving component. The engagement force provided by the first engaging element and the second engaging element facilitates the signal contact portion disposed on the sleeving component and the signal terminal disposed on the main body to maintain the electrical connection stably. In order to increase the smoothness of the sliding of the sleeving component relative to the main body, an elastic element is further arranged between the sleeving component and the main body to provide an elastic restoring force, which is smaller than the aforementioned engagement force. In that, after the connector is detached from the electronic device end, the sleeving component is pushed away from the main body, and the signal contact portion disposed on the sleeving component and the signal terminal disposed on the main body are maintained in a normal separation state.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A connector for matching and connecting with an electronic device end, comprising:

a main body comprising an opening end and a sleeved end, wherein the opening end and the sleeved end are opposite to each other, and the electronic device end is matched and connected with the connecter through the opening end;

a sleeving component slidably connected to the main body, and comprising an accommodation space, a conductive contact portion and a signal contact portion, wherein the conductive contact portion and the signal contact portion are accommodated in the accommodation space and arranged in parallel along a first direction;

a conductive terminal fixed to the main body along the first direction and comprising a conductive connection end extended to the accommodation space through the sleeved end and connected to the conductive contact portion in an electrical connection; and a signal terminal fixed to the main body along the first direction and comprising a signal connection end extended to the accommodation space through the sleeved end and detachably connected to the signal contact portion, wherein when the connector is detached and separated from the electronic device end, the sleeving component is displaced relative to the main body along the first direction, the signal contact portion is driven to separate from the signal connection end, and the conductive connection end and the conductive contact portion are maintained in the electrical connection.

2. The connector according to claim 1, wherein when the connector is matched with the electronic device end, the electronic device end is connected to the main body, the conductive terminal and the signal terminal are interfered with the electronic device end, and the sleeving component is displaced relative to the main body along a direction opposite to the first direction, so that the signal contact portion is driven to move toward the signal connection end, and the signal connection end is engaged with the signal contact portion to form an electrical connection.

3. The connector according to claim 1, further comprising a first engaging element and a second engaging element spatially corresponding to each other, wherein the first engaging element is disposed adjacent to the sleeved end, and the second engaging element is disposed in the accommodation space, wherein when the connector and the electronic device end are connected with each other, the first engaging element and the second engaging element are engaged with each other to form an engagement force, so as to maintain an electrical connection between signal connection end and the signal contact portion.

4. The connector according to claim 3, wherein the first engaging element is disposed on the signal connection end, and the second engaging element is disposed on the signal contact portion.

5. The connector according to claim 4, wherein one of the first engaging element and the second engaging element is a hook, and another one of the first engaging element and the second engaging element is a slot.

6. The connector according to claim 3, wherein the first engaging element is disposed on a peripheral wall of the sleeved end, and the second engaging element is disposed on an inner wall of the sleeving component.

7. The connector according to claim 6, wherein one of the first engaging element and the second engaging element is a convex portion, and another one of the first engaging element and the second engaging element is a concave portion.

8. The connector according to claim 3, wherein when the connector and the electronic device end are connected with each other, a clamping force is formed between the connector and the electronic device end, wherein the engagement force is smaller than the clamping force.

9. The connector according to claim 8, wherein the conductive terminal comprises a conductive elastic-clamping arm, the signal terminal comprises a signal elastic-clamping arm, and the electronic device end comprises a tongue, wherein when a pull-out force acts on the sleeving component along the first direction, the sleeving component is slid relative to the main body along the first direction, the conductive connection end and the conductive contact portion are maintained in the electrical connection while the signal contact portion is separated from the signal connection end, and then the conductive elastic-clamping arm and the signal elastic-clamping arm are separated from the tongue, wherein the pull-out force is greater than the clamping force.

10. The connector according to claim 3, further comprising an elastic element arranged between the main body and the sleeving component, so as to provide an elastic restoring force, wherein when the connector is detached and separated from the electronic device end, the sleeving component is pushed and separated away from the main body, wherein the elastic restoring force is less than the engagement force.

11. The connector according to claim 1, wherein when the connector is connected with the electronic device end, an interference length formed between the conductive connection end and the conductive contact portion is greater than an interference length formed between the signal connection end and the signal contact portion.

12. The connector according to claim 1, wherein when the connector is detached and separated from the electronic device end, the sleeving component is displaced relative to the main body along the first direction at a sliding distance, and a spaced distance is formed between the signal contact portion and the signal connection end, wherein the sliding distance is greater than the spaced distance.

13. The connector according to claim 12, wherein a length of the conductive connection end and a length of the signal connection end are equal to each other, a length of the conductive contact portion is greater than a length of the signal contact portion, and the difference of the lengths of the conductive contact portion and the signal contact portion is greater than the spaced distance.

14. The connector according to claim 12, wherein a length of the conductive contact portion and a length of the signal contact portion are equal to each other, a length of the conductive connection end is greater than a length of the signal connection end, and the difference of the lengths of the conductive connection end and the signal connection end is greater than the spaced distance.

15. The connector according to claim 1, further connected to a power supply system, wherein the power supply system comprises a controller configured to control an output voltage transmitted through the conductive contact portion and the conductive terminal, wherein when the signal contact portion is separated from the signal terminal, and the conductive contact portion and the conductive terminal are maintained in the electrical connection, the controller steps down the output voltage or stops the output voltage.

16. The connector according to claim 15, wherein the power supply system further comprises a power-off unit electrically connected to the controller, wherein when the signal contact portion is separated from the signal terminal, and the conductive contact portion and the conductive terminal are maintained in the electrical connection, the controller steps down the output voltage or stops the output voltage through the power-off unit.

17. The connector according to claim 15, wherein the power supply system further comprises a switch element electrically connected to the controller, wherein when the signal contact portion is separated from the signal terminal, and the conductive contact portion and the conductive terminal are maintained in the electrical connection, the controller steps down the output voltage or stops the output voltage through the switch element.

18. The connector according to claim 1, wherein the connector is a USB Type-C connector.

19. A USB connector, comprising:

a main body comprising an opening end and a sleeved end, wherein the opening end and the sleeved end are opposite to each other;

a sleeving component slidably connected to the main body, and comprising an accommodation space, a conductive contact portion and a signal contact portion, wherein the conductive contact portion and the signal contact portion are accommodated in the accommodation space and arranged along a first direction;

a conductive terminal fixed to the main body along the first direction and comprising a conductive connection end extended to the accommodation space through the sleeved end and detachably connected to the conductive contact portion; and a signal terminal fixed to the main body along the first direction and comprising a signal connection end extended to the accommodation space through the sleeved end and detachably connected to the signal contact portion, wherein when the sleeving component is displaced relative to the main body along the first direction so as to separate the signal contact portion from the signal connection end, the conductive connection end and the conductive contact portion are maintained to connect with each other.

20. The USB connector according to claim 19, further comprising an elastic element arranged between the main body and the sleeving component, so as to assist the signal contact portion in separating away from the signal connection end along the first direction.

* * * * *